(12) United States Patent
Suhami

(10) Patent No.: US 9,568,635 B2
(45) Date of Patent: Feb. 14, 2017

(54) METHOD AND APPARATUS FOR MAPPING THE UNDERGROUND SOIL

(71) Applicant: Avraham Suhami, Petah Tikva (IL)

(72) Inventor: Avraham Suhami, Petah Tikva (IL)

( * ) Notice: Subject to any disclaimer, the term of this patent is extended or adjusted under 35 U.S.C. 154(b) by 78 days.

(21) Appl. No.: 14/583,839

(22) Filed: Dec. 29, 2014

(65) Prior Publication Data
US 2016/0187524 A1    Jun. 30, 2016

(51) Int. Cl.
| G01V 3/12 | (2006.01) |
| G01V 3/18 | (2006.01) |
| G01V 3/26 | (2006.01) |
| G01V 3/30 | (2006.01) |

(52) U.S. Cl.
CPC .................................. G01V 3/30 (2013.01)

(58) Field of Classification Search
CPC .............. G01V 3/12; G01V 3/18; G01V 3/26; G01V 3/30; G01V 3/38
USPC ........ 324/329–332, 334–335, 338, 339, 357; 702/5; 340/539; 342/21–22; 455/404.2, 455/175
See application file for complete search history.

(56) References Cited

U.S. PATENT DOCUMENTS 5,408,182 A * 4/1995 Stolarczyk ............... G01V 3/34
324/338

* cited by examiner

*Primary Examiner* — Tung X Nguyen
*Assistant Examiner* — Neel Shah

(57) ABSTRACT

The invention describes a method and system, for mapping non-magnetic soils in terms of their local permittivity and velocity of the traversing electromagnetic waves, by measuring the straight-line attenuation and elapsed time between transmitters and receivers located within tubes inserted into the soil.

16 Claims, 11 Drawing Sheets

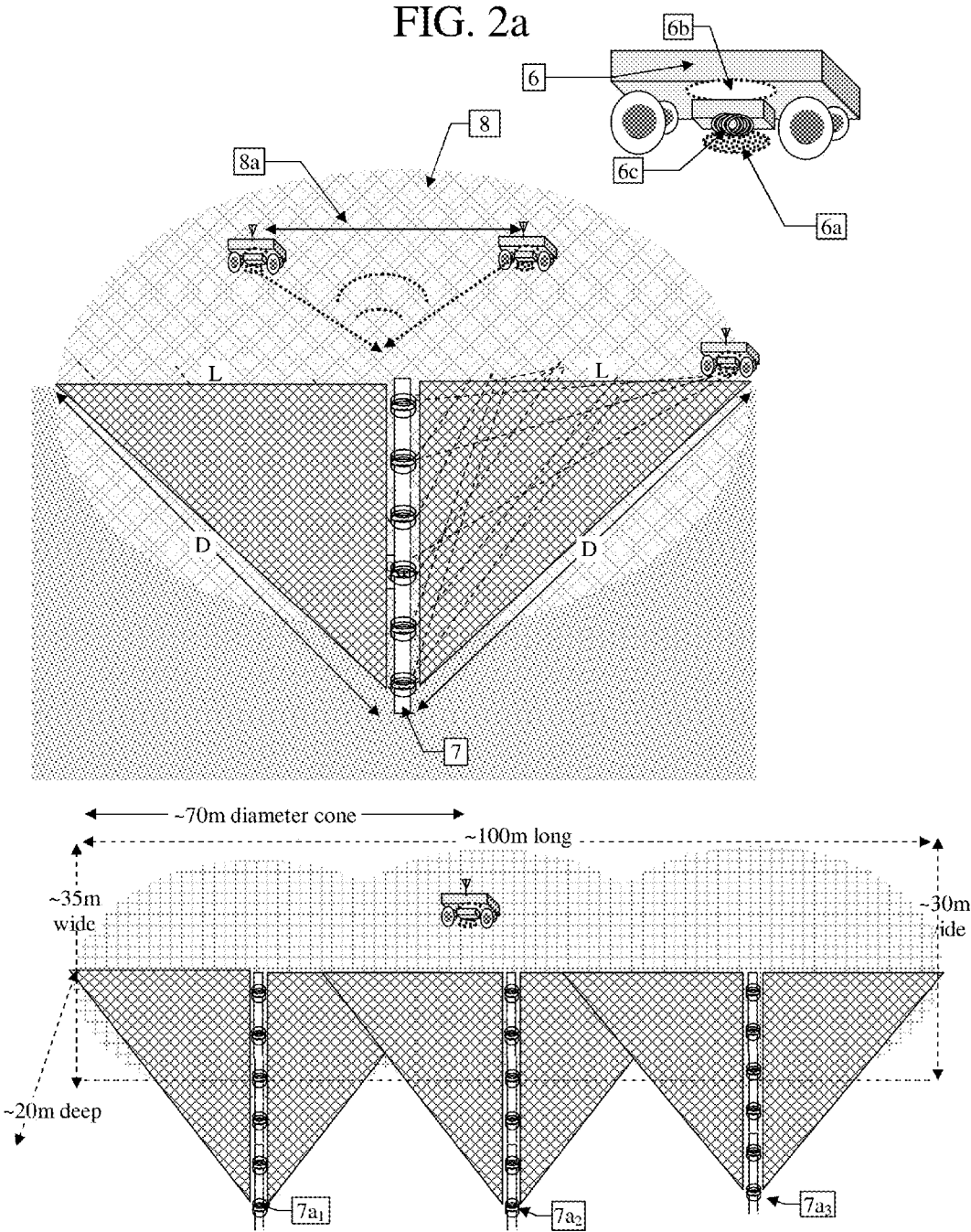

METHOD AND APPARATUS FOR MAPPING THE UNDERGROUND SOIL

FIELD OF THE INVENTION

This invention relates to the fields of geophysics, mining and security

BACKGROUND

Mapping the soil underneath ground is of great interest in many areas. Before constructing anything above ground, houses, roads and bridges, it is essential to know what is beneath them. Mapping the deep soil characteristics including its compressibility, its conductivity, its moisture content and the presence of voids and air cavities whether natural or man-made, are parts of the general construction requirements.

The general theory of tomography is well known (see for example *Principles of Computerized Tomographic Imaging, IEEE Press* 1988—by A. C. Kak and Malcolm Stanley). In principle mapping what is inside an object, is nothing more than solving a set of (n) independent equations of (n) unknowns, part of high school algebra. In the case of a substantially round object, for example a cross section of the human body, the number of independent equations may be established by "looking" at the object from (n) different directions around it, where every "view" is slightly different, but in the total all the necessary different combinations may be viewed.

Looking at the Tomography theory from this simplistic point of view, the major problem in "soil tomography" is that it is hard to view an object in the soil or a portion of it, from all the angles around it, in the soil. The second major difference is the "straight-line-rays" technology; while in a medical CT, a collimated X-Ray beam, may be viewed as a "straight-line-ray", there is no such technology in "soil tomography". Viewing a focused electromagnetic beam as a "straight-line-ray" is a good approximation only at microwave frequencies, that do not penetrate the soil, but not at meter long wavelengths, that do penetrate it.

The soil tomography literature is replete with papers trying to circumvent these basic limitations; see for example "Giroux et al. in Computers & Geosciences 33 (2007) 126-137".

It also has to be realized that the attempts to define the soils in general, in terms of their conductivity($\sigma$), permittivity($\in r$) and permeability ($\mu$) and their respective functions of frequency, is an approximation of the reality; the field measurements in soils often do not fit theory, but in very gross lines. Consequently soil maps too, based on further approximations needed to accommodate certain mathematical techniques often misrepresent reality of specific cases. Consequently simple models that have a limited validity and assumptions applicable to specific cases are of great practical value.

Compressible soils and air cavities whether natural or man-made, like abandoned mines, may cause over time, instabilities of structures such as roads, bridges and hi-rise buildings built over or near them. Mapping the underground soil before erecting any structures over or near them is essential, before and after construction, as the underground may change in time due to many factors, some natural and some man-made.

In agriculture, soil moisture and its compressibility are major factors dependent on the structure and composition of the deeper layers and consequently need to be mapped ahead of time.

In archeology too, a method for mapping underground air cavities at moderate depths, without damaging the top layers, is of great value, specially under sites previously discovered and partially excavated. Mapping of the deeper layers may point to where to excavate instead of digging on intuition only, consequently saving time and money.

Enforcing border controls and stopping traffic of illegal merchandise is a problem in many countries given the fact that, a large part of the illegal traffic has been driven underground, mainly using existing natural conduits, water tubes, and drains. The policing of these known routes have pushed traffickers to dig and excavate sophisticated new conduits in isolated areas. Consequently a method for prospecting for passageways in the underground soil is of great benefit for policing border lines.

SUMMARY OF THE INVENTION

The invention describes a system for mapping the underground soil, in terms of its conductance and permittivity using electromagnetic antennas to measure elapsed time and attenuation of straight-line rays between transmitters and receivers at optimal frequencies that maximize signal-to-noise-ratio between said antennas.

A major part of the current invention is a technology that enables to implement the straight-line approximation in Electromagnetic Tomography, by following the Fermat's principle of least time. Given a Transmitter's electromagnetic signal originating at $T_0$ within $\Delta T_0$, the radiation that will reach the Receiver within the least time is viewed as the Signal and everything else considered as Noise, including transmitter generated radiation that arrives later than the least-time ray(s).

The practical implementation of the method is explained in conjunction with FIG. 5 below. Defining the signal-to-noise ratio (S/N) in this form, in the time domain, has some subtle but important consequences. Correlating the Receiver's active time with the Transmitter's narrow pulse width and keeping the Receiver shut, before and after the arrival of the signal that reached the Receiver in the "least time", classifies part of the Transmitter's emitted radiation as "noise".

Any interaction of the transmitted electromagnetic wave with the soil, is considered noise, as it takes time. Multiple refractions or scatterings that cause deviations from the straight-line and increase travel time are considered noise, and discarded automatically by the acceptance time-window of the receiver.

While this "Straight-Line-least time" regime improves S/N it also reduces the absolute Signal magnitude. However, this deficiency may be amended in the time domain, by repeating the process over time, as many times as one wants, until the signal reaches the minimal detection level of the Receiver, while keeping the improved (S/N) intact.

This method is of course applicable, only if the other sources of noise are random, such as the Johnston noise of the receiver.

The great advantage of the method is the increased distance between the Transmitter and the Receiver that the method enables, for implementing soil tomography over larger distance and volumes of soil.

The initial goal in this invention is to image air-cavities with conductivity 0, permeability 1, and permittivity 1, within soils with higher conductivity, permeability and permittivity.

Mapping air cavities characterized by ($\sigma=0$, $\in_r=1$ and $\mu=1$), and compressible soils characterized by relatively low contents of air and moisture, are prime applications of the invention.

The system may be implemented by using transmitters and a facing receivers at the same level, within two tubes, inserted vertically into a borehole in the ground, to practically any desired depth, or between a single tube inserted into the earth and a roaming mobile transmit/receive antenna that communicates with the antennae within the tube.

Larger volumes of soil may be scanned using 3,4 or more tubes with transmitters and receivers moving along the tubes and measuring transmittance between the tubes at various depths, for mapping the areas between the tubes; adding to the tubes inserted into the soil, a mobile area scanner housing a transmitter and a receiver, placed on top of the tubes for measuring the attenuation at various depths along couples of tubes, enables to map the entire plane or volume between the tubes, up to the soil surface, in terms of the permittivity of the soil, at frequencies where permittivity is much larger than electrical conductance.

The soil close to the surface, around a single tube housing transmit/receive antennae, may also be mapped by measuring attenuation and/or elapsed time with transmit/receive antennae mounted on a mobile scanner and roaming around the tube.

The system architecture is in principle not limited by the depth of the area to be mapped, as it is based on measuring the transmission between transmitters and receivers at opposite tubes at the boundaries of the area to be mapped.

A multiplicity of tubes may be placed at geographically convenient locations that enable to delineate and map an underground area between the tubes and or between tubes and roaming mobile antennae.

As it will further explained below, in conjunction with FIG. 6, the lateral place of the air-cavity between the tubes, may be found by measuring the transmission between a transmitter at given level and several receivers at levels above and below the transmitter's level. In fact as it will be elaborated in conjunction with FIG. 5 below, air cavities are found by measuring the degree of transmission of electromagnetic radiation between geometrically equidistant points, at different levels of depth, beneath the ground.

The transmission intensity between geometrically equidistant points, being a function of the soil conductance ($\sigma$), its relative permittivity ($\in_r$) and its permeability ($\mu$), will not change for as long as the parameters ($\sigma$), ($\in_r$) and ($\mu$) do not change. These constraints however are a function of the route the radiation takes from the transmitter to the receiver. Given a straight-line route, and the same ($\sigma,\in_r,\mu$) characteristics, the elapsed time ($T_1-T_0$) from the transmitter to the receiver does not change for a given distance, and from one depth level to another. Small changes in ($\sigma,\in_r,\mu$) cause small changes in the elapsed time and the related attenuation. Consequently given the large attenuation, when crossing a "soil-to-air" followed by an "air-to-soil" discontinuities characterizing an air cavity, the large change in the transmission intensity of the order of 70-80%, at several consecutive depth levels, points to the existence of an air-cavity at these levels. Measuring the radiation transmission between every single transmitter in a tube and all receivers at consecutive levels at the opposite tube, enables to map the area between the tubes and obtain the boundaries of the air cavity. Transmitters and receivers may be inserted into the tubes sequentially and fill all their lengths or alternatively they may be inscribed on the walls of the tube and thus may be in direct contact with the soil. Again alternatively, transmitters and/or receivers may be lodged within capsules that can move within a tube, reach any desired depth and change their inclination and circular direction in order to face counterpart transmitters or receivers within another tube.

Various sensors and the processing electronics housed in the capsule communicate with the master processors/controllers at the top of the tube by wire or wireless while the tubes communicate with other tubes by cable or wireless means and with a central control unit by secured wireless communication. Last and not least, the operation of an entire system encompassing transmitters and receivers, whether mobile or within tubes may be fully automated and controlled securely from afar.

BRIEF DESCRIPTION OF THE DRAWINGS

FIG. 2a illustrates a method of mapping the soil around a tube inserted into the soil and containing a series of loop antennae along the tube and communicating with one or more mobile scanning antennae that roam the area around the tube.

DETAILED DESCRIPTION OF THE PREFERRED EMBODIMENTS

Figure 1:
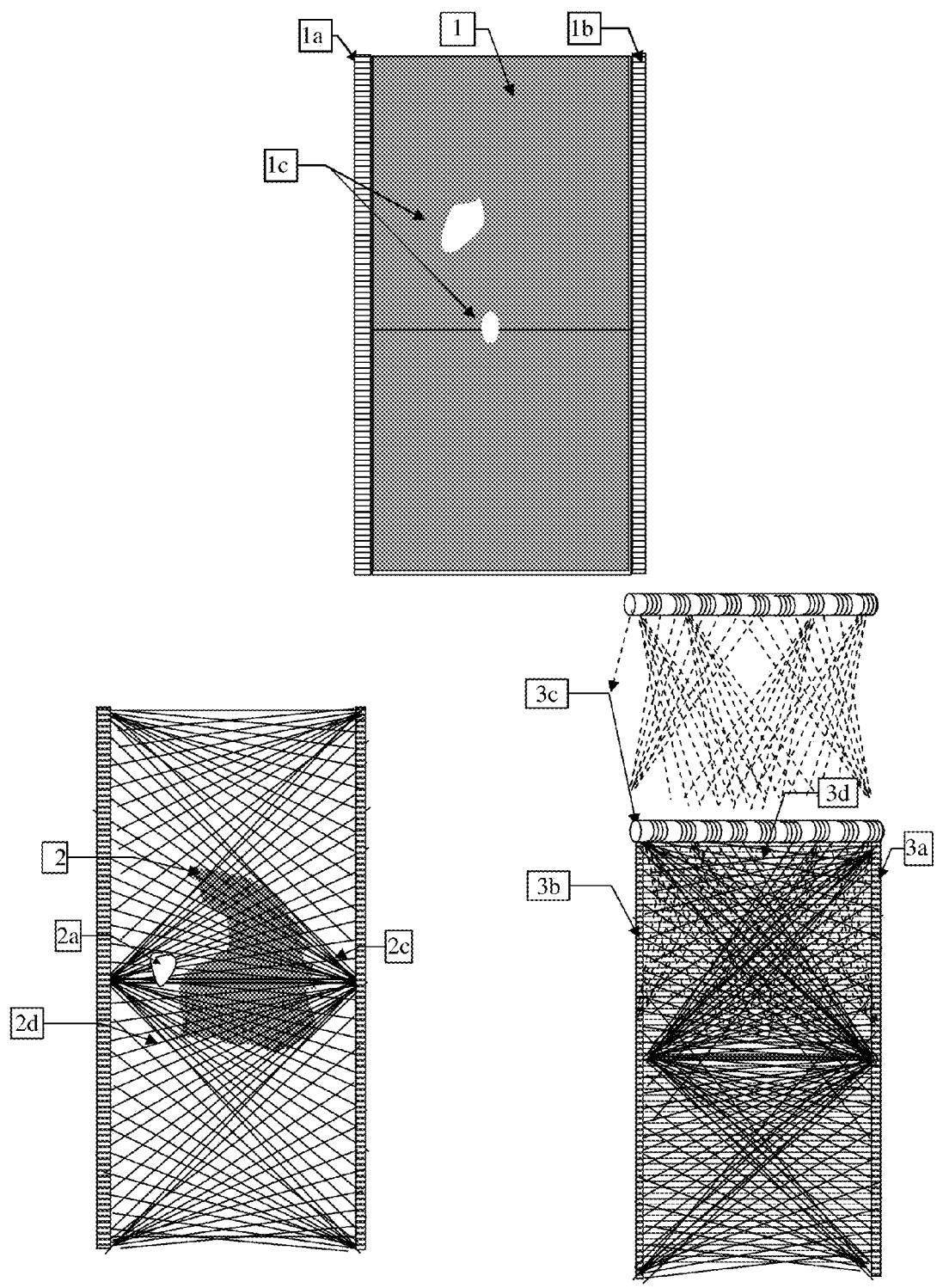
FIG. 1 illustrates 3 modes of imaging the underground soil between 2 tubes, parallel ray imaging for substantially uniform soils, cross-attenuation imaging of "sections" of the soil between the tubes and top-soil imaging using an additional scanner connecting the tubes inserted into the soil.

FIG. 1 illustrates 3 modes of imaging the underground soil with electromagnetic waves. The first mode is applicable specifically to non-magnetic soils characterized by relatively uniform or slowly changing conductivity and permittivity, with air cavities inside. Imaging cross sections of these kinds of soils is straightforward, by measuring straight-line transmission of electromagnetic waves along parallel lines 1 from near surface to practically any depth, assuming that attenuation doesn't change much, but when crossing air cavities 1c. The air cavities are spotted as decreased attenuation of straight-line transmission between a transmitter and a receiver at the same depth, within tubes 1a, 1b inserted into the soil.

The second mode illustrated in FIG. 1 pertains to soils with large changes in the soil characteristics of conductivity, permittivity and permeability such that the straight line attenuation between two points at the same depth cannot be attributed only to an air cavity in between the transmitter and the receiver, but also to large discontinuities in the soil. One or more regions of high permittivity 2 may attenuate the transmission as much as an air cavity 2a, and consequently it is harder to attribute the additional attenuation to the presence of an air cavity or a change in the soil composition.

In this case, the solution is to trace the attenuation along straight-lines of different directions between the tubes, and assuming that the different straight lines criss-cross, 2c, 2d the different permittivity regions in different regions, solve several independent equations with the same number of independent unknowns, in other words to do a Soil Tomography. The set of equations may be simple and easy to solve or very complex depending on the assumed composition and complexity of the terrain. Assuming the soil to be non-magnetic and selecting a frequency where the permittivity $\in_r$ is much larger than the conductance ($\sigma$) and large pixel sizes, the set of algebraic equations are easier to solve.

The third mode of imaging the soil comes to resolve the problem of the area between tubes that are close to the surface 3d, or close to the bottom, which are not traversed by a sufficient number of straight lines originating from the antennae in the 2 tubes 3a, 3b inserted in the soil; therefore there are not sufficient independent equations, including the pixels close to the surface, that enable to solve the set of equations and find the permittivity of all pixels. To remedy this problem a third antenna 3c is placed on top of the two vertical tubes, said tube having transmitter and receiver antennae along its length, and therefore can measure attenuation straight-line routes to the antennae within the tubes 3a, 3b traversing pixels close to the surface 3d.

Figure 2:
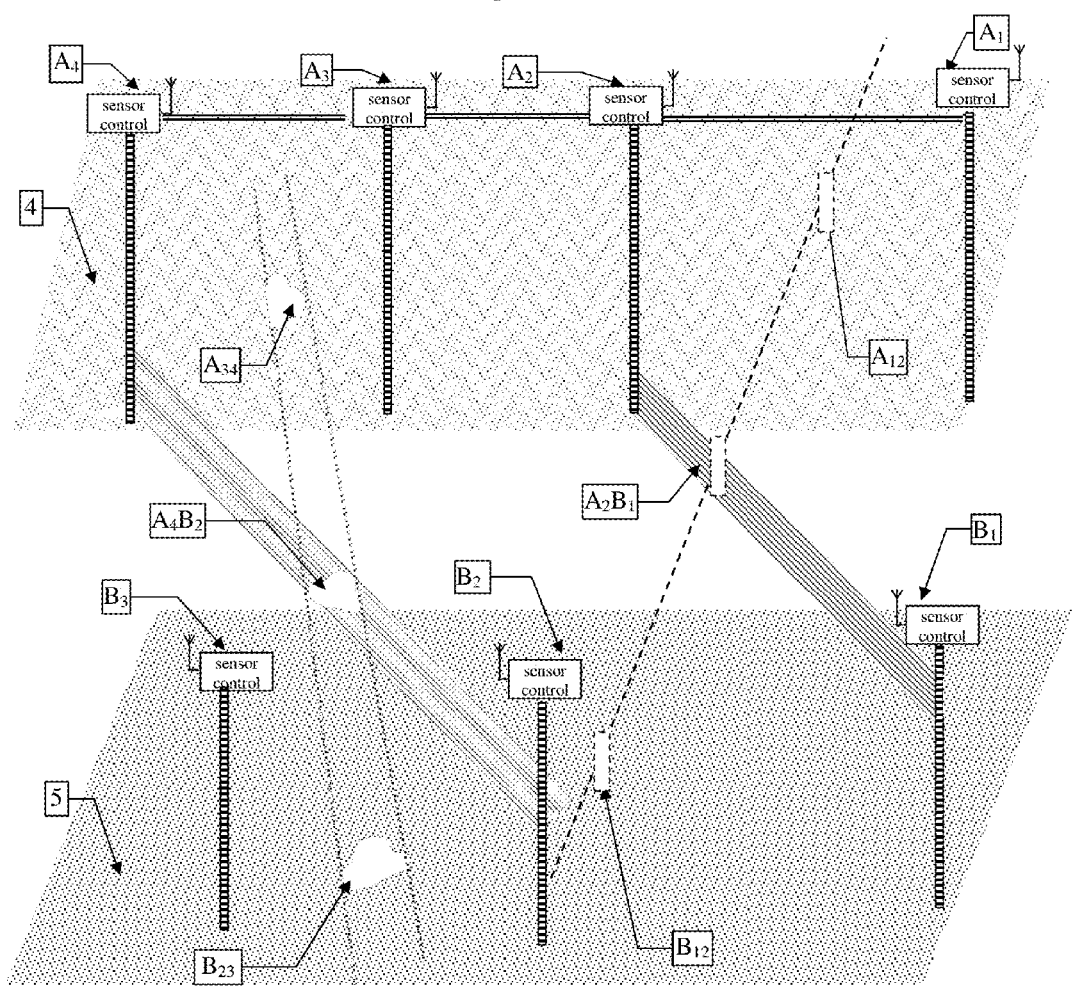
FIG. 2 illustrates the imaging of underground air cavities and communications using transmitters and receivers within an array of tubes inserted vertically into the ground.

FIG. 2 illustrates the finding of underground air cavities using transmitters and receivers within a meandering line of 7 tubes $A_1, A_2, A_3, A_4, B_1, B_2, B_3$ inserted vertically into the ground. The triangular geometry of the array accommodates the geography of the terrain while the distance between tubes is smaller than the maximal distance that a transmitter may reach, such that any tube may communicate with at least two other tubes. This web geometry enables to find air cavities extending at lengths larger than the distance between the tubes and also obtain direction information of the air cavities ($A_4B_2$), ($A_2B_1$), ($A_{12}$ to $B_{12}$)

Figure 8:
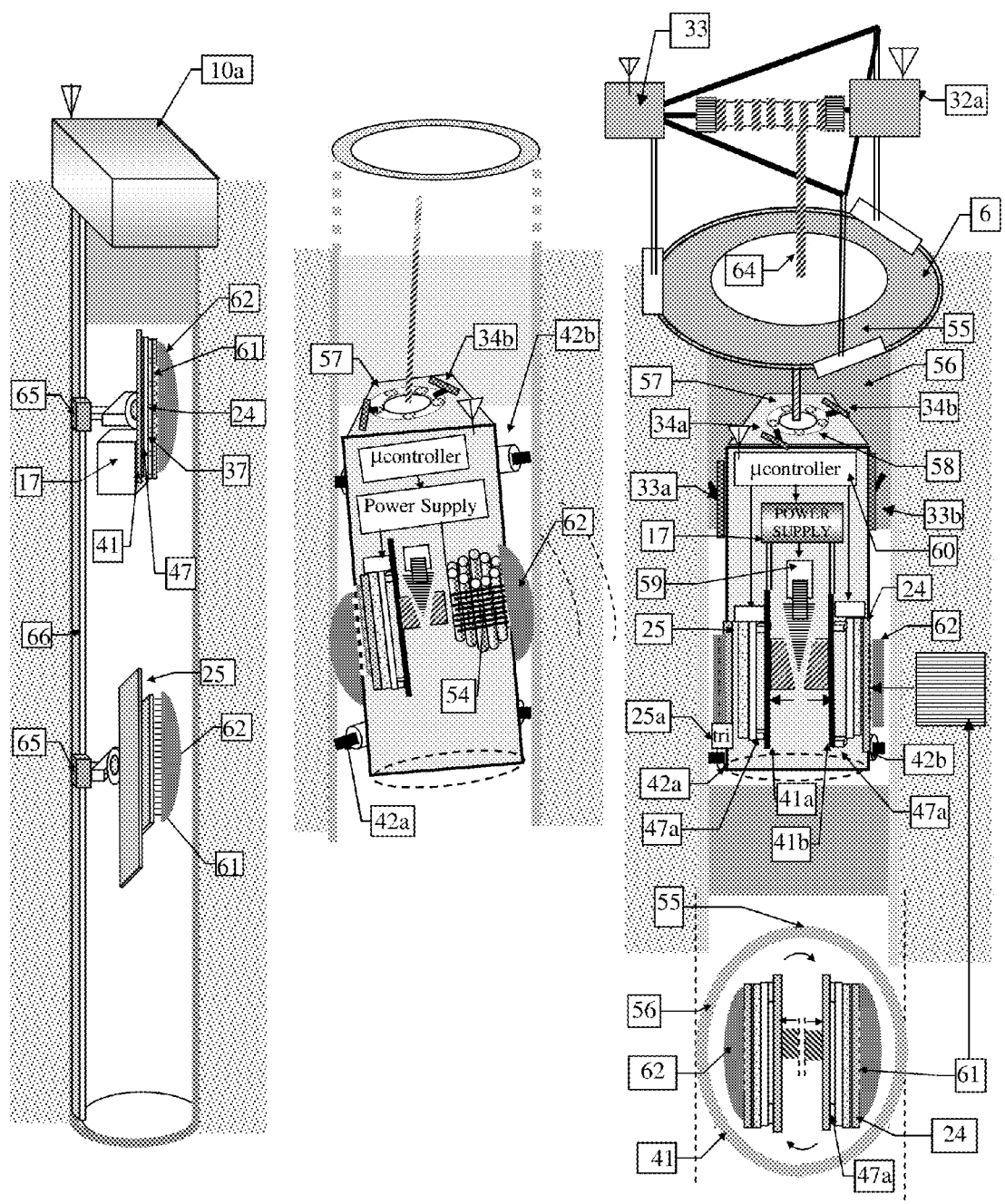
FIG. 8 illustrates a capsule carrying two back-to-back transmitter and receiver antennae that can turn circularly around and change inclination, in order to better face a corresponding antenna on a facing tube. The figure also illustrates single transmitters and receivers that can slide along rails affixed to the interior wall of a tube.

The tubes may be packed with couples of transmitters and receivers all along their length, enabling at any depth to have a transmitter transmit a signal in the direction of a receiver located at an adjacent tube. Alternatively a transmitter, a receiver or both may be placed in a capsule that can move within a tube and upon reaching a desired depth establish contact with another transmitter and/or receiver located in a similar capsule at an adjacent tube and enable measurement of the attenuation between them. Transmitters and receivers within capsules may reorient the direction of their beams by changing their inclination and turning around as illustrated in FIG. 8.

Electromagnetic waves crossing the walls of a tunnel or an air cavity's cross-section are refracted and reflected due to the mismatch between the permittivity of the soils, the walls of the cavity and that of the air inside it. When the wavelength of transmitted radiation is of the order of the dimensions of the air cavity's cross-section the refraction and reflection are maximized. Similarly the interaction is maximized when the polarization of the wave interacting with the air cavity walls, is in the same plane as its long dimension. Consequently the intensity of the wave crossing the air cavity may be reduced to less than 20-30% of its intensity before crossing it, if the polarization and wavelength conditions are met. However at large distances, as electromagnetic waves emitted by the transmitter, will also reach the receiver, without going through the air cavity, by propagating through the soil under and above the air cavity, they will also contribute to the receiver's signal that may obscure the drop in intensity of the signal that propagated directly through the air cavity. However, as the receiver is programmed to act according to the principle of "least time", radiation that reaches the receiver later than the radiation that reached the receiver in least time, will not be registered.

The existence of an air-cavity at a certain depth, crossing one or more inter-tube connecting lines, may be determined by the measurements between two tubes, as explained below in conjunction with FIGS. 5 and 6. For example the air cavity $A_{12}$ will be spotted by the Straight-Line measurements between tubes $A_1$ and $A_2$, while air cavity $A_{34}$ will be discovered by Straight-Line measurements between tubes $A_3$ and $A_4$, and air cavity $A_2B_1$ by Straight-Line measurements between tubes $A_2$ and $B_1$ and finally air cavity $B_{12}$ will be discovered by Straight line measurement between tubes $B_1$ and $B_2$. The "extension" of the air-cavity route beyond the region covered by the array of tubes may be extrapolated to outside the array. For example linking the place and depth findings of air-cavities $A_{34}$ and $B_{23}$, and assuming that they belong to the same passageway, the route and exit place of said passageway may be found. In the same manner extrapolating the place and depth of the air cavities $B_{12}, A_2B_1$ and $A_{12}$, the route and probable exit place of this passageway may be guessed.

FIG. 2a illustrates another mode of mapping the soil using one tube containing electromagnetic loop antennas 9 inserted into the soil, and a robotic mobile antenna 7, roaming on the soil around the tube and exchanging attenuation data with the antennae at different depth levels of the tube.

The robotic mobile Transmitter/Receiver antenna 6 is mounted on wheels and may move over the top soil 8 around the tube. After setting the direction of the antenna that can operate as transmitter or receiver, the mobile scanner settles on the ground on top of a flexible bag 6a filled with material having the same dielectric constant as the soil, by inflating a balloon 6b or some other mechanical means atop the antenna 6c that pushes the antennae downwards. The exact position of the mobile transmit/receive antennae are determined by various sensors, including high resolution GPS receivers, so that the Straight-Line distance from the antennae on the tube can be determined with high accuracy. Only after this calibration process, the mobile Transmitter/Receiver antennae 6c can transmits or receive electromagnetic pulses in the desired direction, as detailed below in conjunction with FIG. 5.

The tube encompassing loop antennae inscribed on the plastic surface of the tube, described in conjunction with FIGS. 9 and 10 below is particularly suitable to this application, as loop antennae are practically omni-directional beyond one wavelength, and thus can reach and connect with the robotic mobile antennae that roam around, albeit after a short calibration to take in account its directional efficiency, for correcting the straight-line attenuation of rays coming from different directions. While this characteristic of the loop antenna being non-directional is in general wasteful, our application is not particularly sensitive to the power of the transmitter, as it can compensate for it by increasing the duration of the measurement, as explained below in conjunction with FIG. 5. The maximal reach of the transmitter being $L=((D^2)/2)^{1/2}$, for a maximal Straight Line reach of D=50 m between the transmitter and the receiver, the maximal depth L that the soil can be probed is 35 m from the surface.

In this case, the volume of the soil cone around the tube that can be imaged is $[(\pi L^2)L/3]$. The surface of the base of the cone being $(\pi L^2)$ and the height of the cone having L levels of transmitter/receivers along the depth of the tube, $[(\pi L^2)L]$ straight-line equations may be generated, 3 times the number of the needed equations to solve the values of the $[(\pi L^2)L/3]$ voxels around the tube, using an algebraic reconstruction tomography algorithm.

The method of exploring the top layer surface of the soil with one tube and a mobile antenna, has many applications, specifically in all GPR related applications, with much better results.

Two mobile antennae located at a short distance between them may be used for probing the top underground soil 8a, layer by layer. They may transmit in unison short electromagnetic pulses into the soil, in such directions that they overlap at a depth that may be estimated by clocking the two-way transmit/receive times between the 2 mobile antennae, for a given time window that determines its width. The change in density of successive layers may be measured, by changing gradually the directions of the radiation transmitted in unison by both mobile scanners, the time and time-window for detecting the back-scattered radiation, and appropriately increasing the intensity of the transmitted radiations in order to compensate for the increased distance of the layer. The same exercise may be repeated from several close locations in order to map the 2D density of the layer. 3 mobile scanners repeating the same exercise will achieve a better estimate of the density distribution of the top layers of the soil.

One of the purposes of imaging the top layers of the soil of a limited area is, for exploring the place where to insert a tube housing antennae along its length. If the initial probe, by two or more mobile scanners do not show a strong reflector, such as a boulder for example, an exploratory tube 7 may be inserted in the soil and an initial tomography of the cone surrounding said tube at an initial depth may be done.

The tube may be inserted into the soil in stages while repeating and enlarging the volume of underground soil being mapped. This procedure of inserting a tube into the soil in stages, after imaging by reflection, the specific place where the tube is to be inserted, is suitable in sensitive locations where there may be a danger to damage existing objects in the soil, such as in an archeology site.

The conical mapping system, consisting of single tubes 7 containing transmitters and receivers with roaming mobile antennae, is a very flexible system that may cover complex routes and locations. For example a tube inserted into 35 meter depth forms a cone of 70 meter diameter with half depth of ~20 meter enabling to map and explore an underground area in excess of 2000 m² down to 20 m deep. 3 tubes, $7a_1, 7a_2, 7a_3$ illustrated in FIG. 2a covering overlapping areas for mapping, may form a 100 meter long 35 meter wide and 20 meter deep strip of soil for the purpose of finding exit locations of passageways. With some improvements of the settling time of the mobile antenna, a strip of 1500 m² may be scanned and mapped in less than a day.

Figure 3:
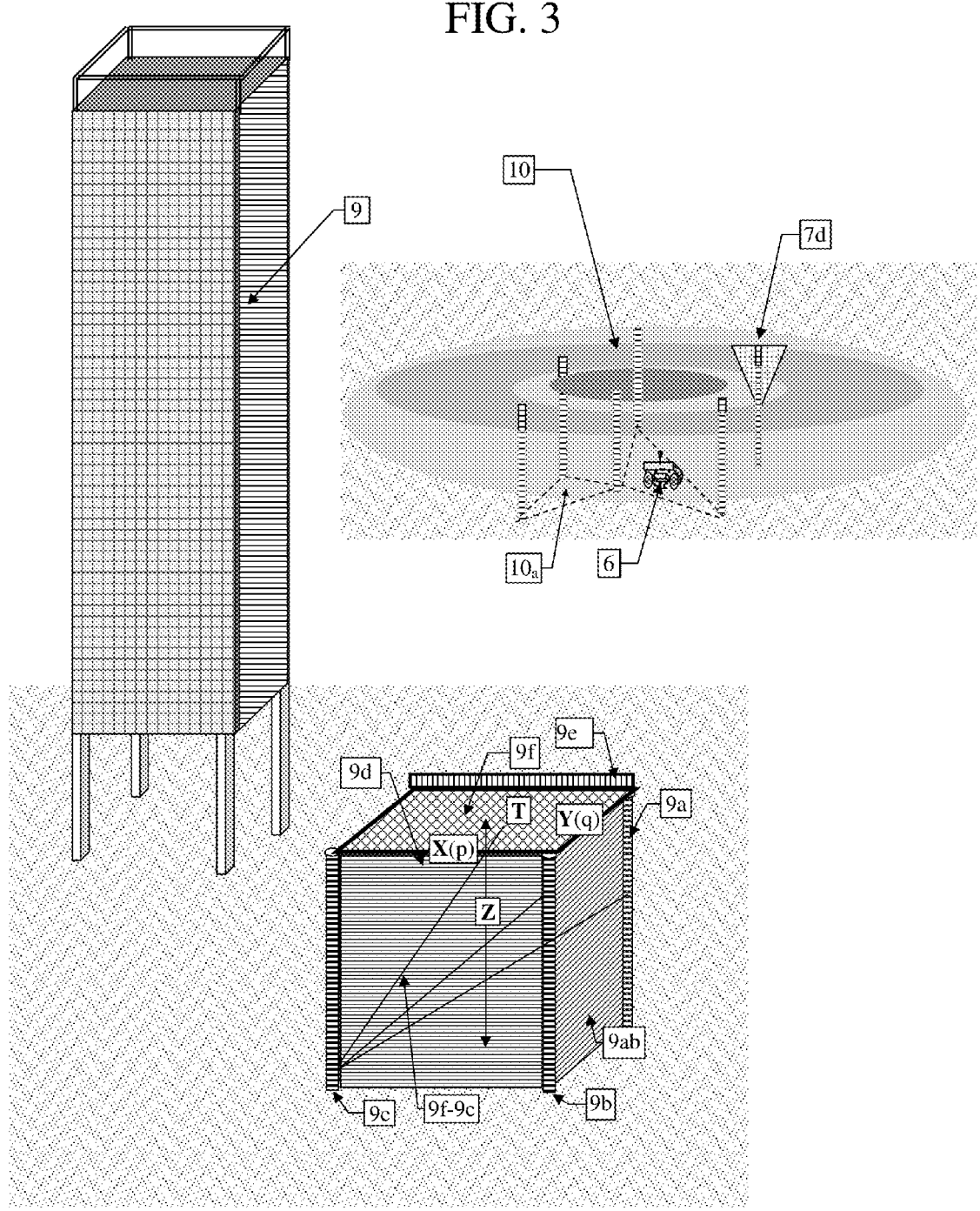
FIG. 3 illustrates the mapping of a soil volume to great depths, for example under a planned high rise building, or an archeology site, using transmitters and receivers within vertical tubes inserted into the ground, and an horizontal scanning transmitter/receiver antenna, that may be mobile, for measuring transmission from the soil surface to each of the antennae along the tubes.

FIG. 3 illustrates the imaging of the foundations underneath a high-rise building 9 or the lower levels of an archeological site 10 in terms of the permittivity of the soil, down to great depths. The ability to map the soil underneath the ground on which a high rise building is to be erected, is of great value, as it helps to optimize the structure's design and stability in various circumstances. The permittivity map of a volume of soil delineated by 4 tubes inserted into the soil down to depth Z, said tubes containing movable transmitters and receivers that can be oriented in 3D towards receivers and transmitters contained in the other tubes, may be computed using the algebraic reconstruction tomography (ART) algorithms, which basically is the calculation of (n) unknowns, given (n) independent equations of the (n) unknowns. When the (n)×(n) matrices are small the solution is simple and performed by inversion of the matrix. However for large matrices as inversion is not practical, successive approximation by iterative methods have been developed. The generation of the needed (n) equations may be accomplished in several steps consisting of:

1—Mapping the 6 vertical planes (9a-9b, 9b-9c, 9c-9d, 9a-9c and 9b-9d) of said volume formed by the 4 vertical tubes 9a, 9b, 9c and 9d, inserted into the soil, wherein the respective attenuations between each level (n) in one of the tubes 9j and each of the levels (m) in tube 9k for j,k=a,b,c,d and n,m=1 ... Z and vice versa, are measured.

2—Mapping the attenuation between the top layer grid T(x,y) for x=1 ... p and y=1 ... q, scanned by a mobile Transmitter/Receiver 9e, and each of the levels n,m=1 ... Z of the tubes 9a, 9b, 9c and 9d.

3—The permittivity of all voxels of the volume (X,Y,Z) not traversed by the transmitter-receiver straight-lines as in 1 and 2 above, will be assumed to have the average permittivity of the closest voxels surrounding said voxel.

The scanning procedure defined above is to be carried at electromagnetic frequencies ($\omega$) where the permittivity $\in_r$ is much larger than the conductance ($\sigma$) ($\sigma/\in_r \ll \omega$), and consequently the velocity $(v)=(\in\mu)^{1/2}$. Measuring the "straight-line" transit times ($t_{nm}$) between level (n) in one tube to level (m) in another tube, and given the distance $D_{x(i),y(j),z(k)}$ between the two, gives an equation $(t_{nm})=f((\in\mu)_{x(i),y(j),z(k)})^{1/2}$. Given the scan regime explained above, a sufficient number of independent equations related to the voxels (x(i),y(j),z(k)) may be generated to compute the permittivity of each of the voxels using one of the ART algorithms.

For example a (50 m×50 m×50 m) volume with 0.5 m resolution contains $10^6$ voxels; therefore to obtain the permittivity of each of the voxels, $10^6$ independent equations are needed. The top layer (T) of $100^2$ pixels reaching to each of the 4 tubes, each tube having 100 levels, provides $100^2 \times 4 \times 100 = 4.10^6$ straight lines; in addition the 6 planes between the 4 tubes also generate $6 \times 100^2$ lines or $0.6 \ 10^5$ independent straight lines, or in total $4.06 \ 10^6$ equations. However this is true only for the first section of the total volume between the tubes that may have lengths (L) larger than the distances (D) between them. The sections following the first $D^3$ volume have a lesser number of straight lines traversing them and consequently a lesser number of equations to reconstruct the map beyond the first $D^3$ volume. However if we divide the total volume in a series of overlapping volumes, and the first section is mapped first, the values of the voxels in each of the following section that are not traversed by "Straight-Lines" originating in said section, may have already been computed in the previous section. The number of required equations is therefore reduced and sufficient to find the values of the remaining pixels. The same process may be repeated on and on and consequently enabling to map the entire volume of soil within the tubes.

In the absence of a sufficient number equations incorporating all voxels, a "Continuity" principle may be invoked that says that the change of permittivity from one voxel to its neighbor is continuous, and therefore its permittivity is the average of the 8 voxels around it, ensuring that we always have a sufficient number of independent equations.

The only difference in the archeology application is that the area scanner 9e that scans the top layer (T) of $100^2$ pixels, is replaced by the mobile scanning antennae 6, that measures the attenuation to all levels of the 4 tubes inserted into the soil, from the surface of the archeological site that also is divided into 100×100 pixels; therefore providing $10^4$ times 100 levels for each of the 4 tubes.

The archeological site which is different than the foundations of a high-rise building, may also be divided in triangular sections that cover section of interest or even limited conical sections 7d.

The volume of a triangular section being $(n^2/2)n = n^3/2$ voxels and the number of equations being $(n^2/2)3n + 3n^2 = 1.8n^3$ there are sufficient number of equations to resolve the values of all voxels.

Figure 4:
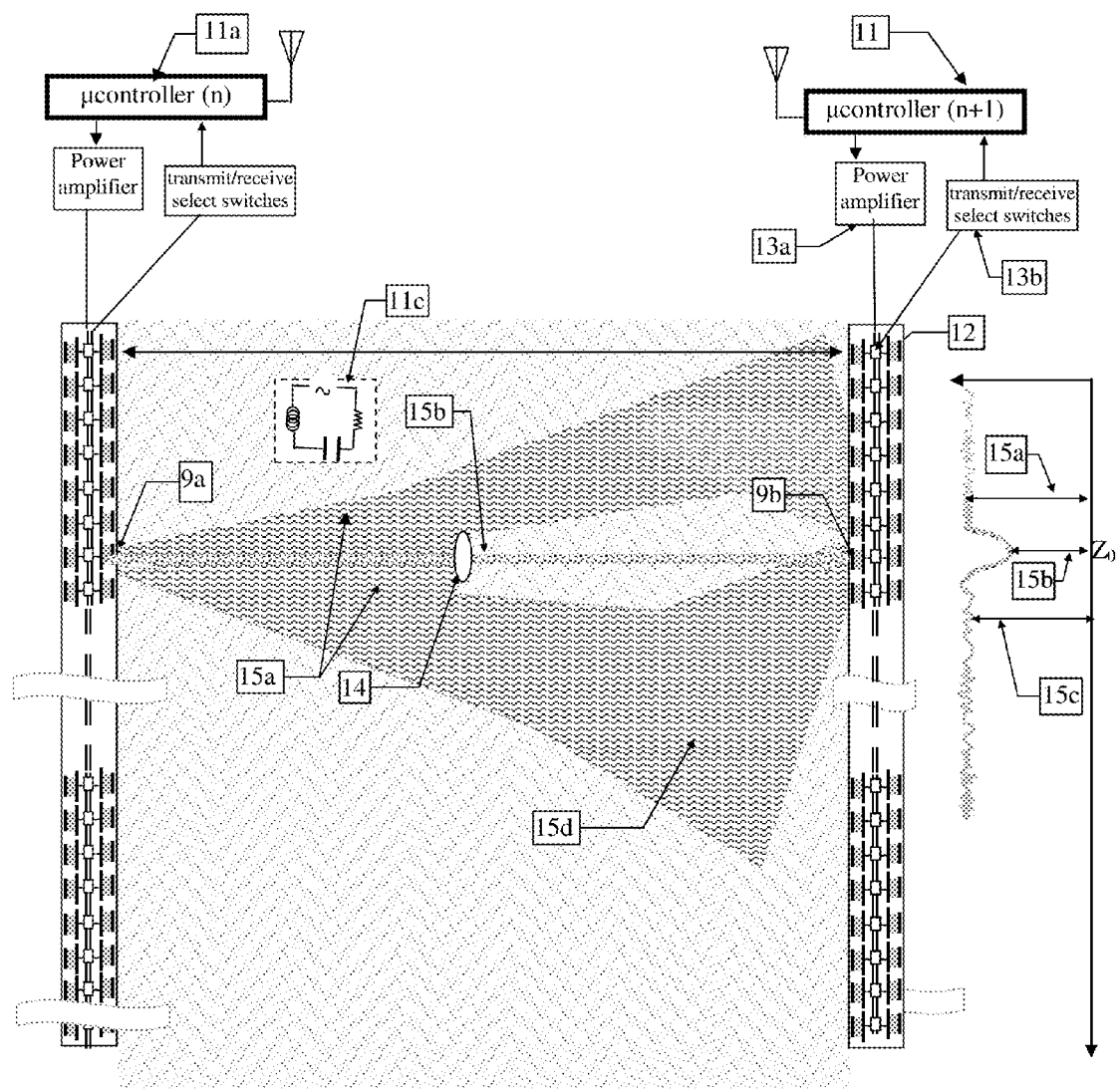
FIG. 4 illustrates a simple mode of detecting a passageway in the soil between two tubes inserted vertically into the ground, wherein each tube accommodates along its length couples of transmitters and receivers wherein a receiver antenna in one tube that senses the attenuated electromagnetic radiation emitted by a transmitter at the same depth in the adjacent tube.

FIG. 4 illustrates two tubes where each tube accommodates along its length couples of electromagnetic transmitters and receivers back-to-back, such that a transmitter antenna in one tube emits a slightly directional electromagnetic pulse in the direction of a receiver antenna located in an adjacent tube at the same depth. The direction of the antennas may be set ahead of time, depending on the application. The illustrated antennas are modified microstrip patch antennas described below in conjunction with FIG. 7 that have a 6 dB power within 60° directivity. The resonant frequency of the patch antenna is mainly determined by its length $f \sim 2L$ along the transmitter line feeding it, and the square root of the permittivity of the substrate between the radiating area and ground. It is therefore advantageous to have the long dimension of the antenna along the length of the tube and position the radiating dimension which radiates horizontally polarized waves, across the width of the tube.

The operation of the transmitter 9a and receivers 9b within each tube is controlled by their respective microcontrollers 11 and 11a that control the power 13a delivered to the transmitter and processes the signal detected by the receiver. The soil separating a transmitter and its counterpart receiver at the same level, has a resonant frequency 11c $w \sim (LC)^{-1/2} \sim (\mu \in_r)^{-1/2}$ proportional to the inverse square root of the permittivity $\in_r$ and the magnetic permeability $\mu$ of the soil. This resonance is more prominent in soils containing traces of iron oxides. Obviously the Q factor of the resonance is dependent on the conductance (1/resistance) of the soil. Consequently it is advantageous to operate at the resonant frequency 11c of the soil between the transmitter and the receiver as it will allow reaching greater distances.

The attenuation of the electromagnetic beam traversing a cross section of the air cavity 14 may be calculated by using the reflection of the electromagnetic wave at the interfaces soil-air and air-soil. The transmission through any material with permittivity $\in_2$, to air is given by $T = 4\in_2^{1/2}/(1+\in_2^{1/2})^2$ when the soil permittivity is $\in_2 = 5$ then $T = (4(2.23)/10.43) = 85.5\%$ For air to soil the transmission is $(4/10.43) = 0.383$ therefore soil-air-soil transmission is 0.328 or an attenuation of 67.2%

For a soil with permittivity as high as $\in = 30$ the transmission to air is $(21.9/41.95) = 0.522$ and from air-soil $(4/41.95) = 0.095$ therefore soil-air-soil transmission is $T = (0.522)(0.095) = 0.05$ and the attenuation is 95%.

The mode of operation of the system is to measure transmission between same level transmitter and receiver of adjacent tubes, one pair at a time, and scan all the length of the tube, using the series of transmitters and receivers. The transmission at successive depths is approximately the same or slightly changes continuously, if the soil between them also changes its composition continuously. However when crossing the level $Z_0$ where the air cavity 14 is, the intensity of the signal 15b will drop appreciably as compared to its level 15a before crossing the tunnel level and the level 15c after crossing the level. The decrease in intensity measured at the air cavity level depends on the amount of radiation propagating around the air cavity 15d and reaching the receiver.

Continuing to measure the transmitted intensity in the following levels may differentiate between the hypothetical air cavity and a sand layer that would develop in different directions. In the case of an air cavity parallel to the ground, the drop in intensity would disappear after a few layers while if the composition of the soil started to be sandy, the drop in intensity would continue.

The size of the intensity drop 15b of the signal at the receiver 9b gives an indication of the location of the tunnel between the transceiver and the receiver, as this signal has two components. One component is contributed by the radiation crossing the tunnel that as we showed above is reduced by over 80%. This is true for all locations of the tunnel between the transceiver and receiver. The second component of the receiver intensity is contributed by the scattered radiation, 15b and 15c, that reach the receiver by tortuous ways. The ratio between the signal traversing the tunnel and that scattered by the soil around the tunnel decreases as the transmitter-receiver distance decreases. The way to improve this "signal-to-scattering noise" is explained below in conjunction with FIG. 5. As illustrated in FIG. 4, at each depth level there are two back-to back antennas that can operate both as a transmitter or a receiver depending on the electronics behind them and activated by an electronic switch 13b. Consequently either the transmitter or the receiver of the adjacent tube has to be enabled by the corresponding switch in order to measure the transmission between the tubes. Although the figure illustrates electromagnetic transmitter and receiver patch antennas, the system may also accommodate other transmitters and receivers. This architecture that consists in filling a tube with couples of antennas that can act as either transmitters or receivers has advantages and disadvantages. It is suitable for simple and low cost transmitters/receivers such as patch or dipole antennas where the cost of the multiple antennas is counterbalanced by the additional costs of more flexible and higher cost antennas that can move to any depth level and any direction and thus are able to map the entire plane between the tubes using Tomography reconstruction algorithms.

Figure 5:
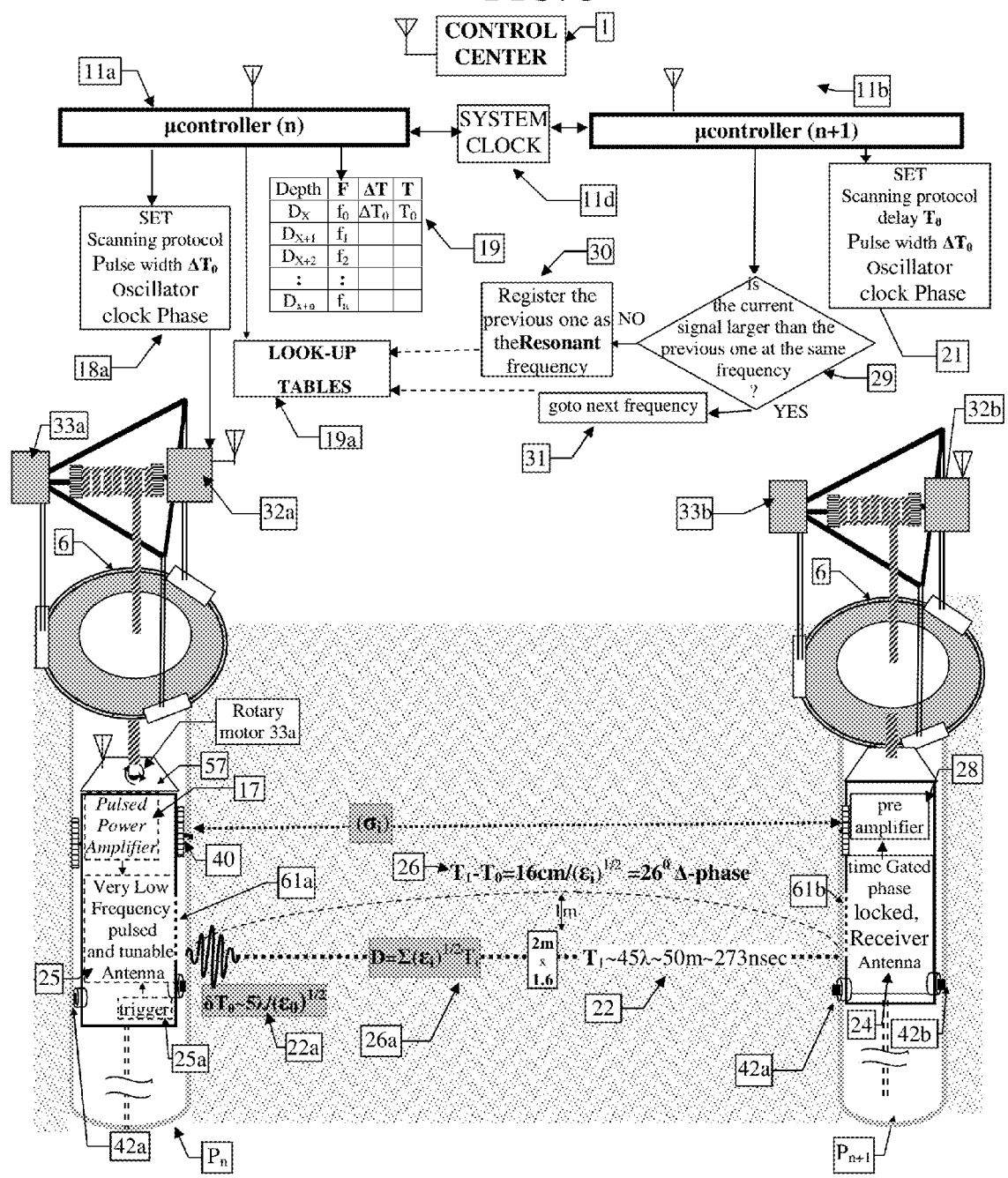
FIG. 5 illustrates the major components of the system that measures the transmission of electromagnetic radiation between two tubes according to the "least time" principle.

FIG. 5 illustrates in detail the major components of a system that controls the transmission of electromagnetic radiation between two tubes $P_n$ and $P_{n+1}$, each at the same depth. While determining the transmission times and attenuation between the different depth levels is essential for mapping the soil through Computerized Tomography, the existence of passageways filled with air may be determined by finding the change of attenuation at the same corresponding depth levels. As the adjacent tubes are at some distance one from the other, they are controlled by autonomous microcontrollers 11 and 11a that coordinate the timing of their actions and by wireless. For example the functioning of the winches 32a and 32b that position the transmitter antenna 25, the receiver antenna 24 and preamplifier 28 are coordinated by their respective micro-controllers 33a, 33b that also synchronize their clocks according to a central clock 11d which is physically located at same time-distance from the clocks that control the timing of transmitters and receivers in the different tubes. The micro-controller 11a also feeds the tube scan protocol 18a to the winch 32a and transmits to the pulsed power amplifier 17 instructions concerning the power level, frequency, pulse width and phase of the oscillator that govern the operation of the transmitter 25 for each and every single pulse.

The microcontroller 11b controls the operation of the winch 32b and its scan protocol 21; it sets the timing protocol of the receiver antenna 24 and its preamplifier 28, concerning "start time" $T_0$, pulse width of the wavelet $\delta T_0$ 22a and measured elapsed time $(T_1-T_0)$ 26. In line with the "least time" method, the receiver starts measuring the intensity of the transmitted electromagnetic pulse after time $(t_0)$ which is the front of the wavelet of duration $\Delta T_0$ 22a, which reaches it after traversing the distance D between the transmitter and receiver, at a speed $V=(\epsilon\mu)^{-1/2}$. In non-magnetic and quasi-uniform soils that may be characterized by an average permittivity $V_{av.}=(\epsilon_{av})^{1/2}$ and $D=(\epsilon_{av})^{1/2}\Delta T$ This distance is dependent on the soil characteristics as. In non magnetic soils, at operating frequencies $\omega$ where the permittivity $\epsilon_r$ is much larger than the conductance $(\sigma)$, $(\sigma/\epsilon_r<<\omega)$ the speed of the electromagnetic wave is a function $(\epsilon_r)^{-1/2}$; this is a way to measure the permittivity of the soil and enables to derive the local permittivity along the route between the transmitter and the receiver using Computerized Tomography methods.

The system may be used with the different types of capsules described below in conjunction with FIGS. 7, 8 and 10, optimized for transmitter and receiver variations. The table below lists the 8 different capsules that may be used.

TABLE 2

| MODALITIES | WIDE CAPSULES TRANSMIT RECEIVE | NARROW & SHORT CAPSULES TRANSMIT | NARROW & SHORT CAPSULES RECEIVE | NARROW & LONG CAPSULES TRANSMIT + RECEIVE |
|---|---|---|---|---|
| ELECTRO-MAGNETIC-type I | X | X | X | X |
| ELECTRO-MAGNETIC-type II | X | X | X | X |

The system microcontrollers 11a, 11b also control the local motor controllers 32a, 32b of the winches that control their motions that include up, down and angular positioning of the "Transceiver-Receiver" capsules. Accurate positioning of the Transceiver and the Receiver requires a feedback loop based on sensors positioned along the tube that monitor their momentary positions and transmit them by wireless to the winch controller.

The transmission antenna 25 emits short electromagnetic wavelets down to $5\lambda$, of low frequency electromagnetic waves at very low duty cycle of around 1:20 to 1:100. The soil penetration doesn't change much, between 10-100 MHZ where the distance $\delta$ (skin depth) at which the electromagnetic beam is attenuated to its 1/e intensity is given approximately by $(2/\sigma)(\epsilon/\mu)^{1/2}$. The operating frequency is optimal when its wavelength is lower than the dimensions of the searched air-cavity. On the other hand the size of the antenna being the determinant factor of the diameter of the tube inserted in the soil, all other things being equal, there is an advantage at working at the highest frequency, in the range of 10 to 100 MHz. For example, in a soil where $\sigma=5$, $\epsilon=30$, operating at 50 MHz gives an effective wavelength of 1.1 m; for a soil with $\sigma=5$ $\epsilon_r=5$ the effective wavelength is 1.9 m, which fit passageways cross-sections of approximately such dimensions.

The antennae requirements are further elaborated below in conjunction with FIGS. 7 and 9.

The tubes inserted into the boreholes feature at their sides facing neighboring tubes, small metallic protrusions for measuring the conductivity $(\sigma)$ 26a of the soil between the tubes at given depth levels. The capsules have at their external walls female plugs 33a that can be pushed onto the metallic protrusions 40 at the sides of the tubes, by the push-pull solenoids 42a, 42, for measuring the conductance $(\sigma)$ of the soil. Measuring the conductivity of the soil independently of its relative permittivity $(\epsilon_r)$ that can be measured in non-magnetic soils by its speed between the tubes, enables to determine the attenuation of the soil which is a function of $(\sigma)$ and $(\epsilon_r)$ at a given frequency.

As different soils have different conductivities, permittivities and permeabilities, it is helpful to view the patch of soil of length D between the transmitter and the receiver as an RLC circuit with a resistance $R(1/\sigma)$, a capacitance $C(\epsilon)$ and an inductance $L(\mu)$. Such a circuit has a resonant frequency $W=(LC)^{-1/2}$. At resonant frequency the transfer of energy between the transmitter and the receiver is the most effective. In fact between the transmitter and the receiver there may be several resonant frequencies. The efficiency Q of the resonant frequency as compared with its adjacent frequencies depends on the resistance $R(1/\sigma)$ of the soil. Given the distance D between the transmitter and the receiver, the resonant frequencies are $\omega_i=D/n_i\lambda_i$ where $\lambda$ is the wavelength of the transmitter in the soil which is different from its wavelength in the air.

Transmitter operation at a resonant frequency minimizes losses and maximizes reach. The resonance frequency at a given depth and specific time may be determined by measuring transmission intensity at a given frequency and then changing said frequency in small steps until the measured intensity is maximized 29, 30, 31. As soil movements, moisture and temperature will change the effective conductance and permittivity, the routine of finding the resonant frequency 19 is automated and repeated before scanning transmission intensities along the tubes $P_n$, $P_{n+1}$.

The above procedure requires the ability to change the frequency of the transmitter continuously in small steps while adjusting the intensity of the beam; the relevant technology is explained below in conjunction with FIGS. 7 and 9.

The time it takes to the electromagnetic waves that may reach the receiver by routes above and below the air cavity is longer than the straight-line route. Therefore by working in short time bursts and gating the receiver's active time-window to a portion ($\delta T_0$) of the Straight-Line time period ($T_1-T_0$), starting the receiver after said Straight-Line time period of the for a short pulse duration ($\delta T_0$), it is possible to suppress all the scattering waves that arrive to the receiver after said pulse duration. In principle, by reducing the pulse duration to a few wavelengths duration and increasing the duty cycle appropriately, so as to receive a measurable signal at the receiver, it is possible to decrease the scattered radiation maximally.

In addition to working in pulse mode, ensuring that the phase of the wave at the receiver is "locked" to the phase of the wave at the transmitter, enables to reject the randomly scattered waves arriving at the receiver by using the "Phase Locked Loop" technology.

In addition selecting the electromagnetic wave emitted by the transmitter to have a polarization parallel to the long direction of the passageway, and accepting only such polarized waves by the receiver, it is possible to eliminate much of the scattered radiation that changes polarization by scattering and subsequently may arrive to the receiver.

The requirement to emit the electromagnetic beam in short pulses $\Delta T_0$ comes to enhance the signal-to-noise ratio measured at the receiver 24 as will be elaborated below. The travel time between the transmitter and the receiver for electromagnetic waves changes widely in different soils as illustrated in the table 3 below:

TABLE 3

| | conductivity $\sigma$ mS/m | permittivity $\epsilon_r$ | EM wave speed cm/sec | 50 m travel μsec | λ at 50 MHz cm |
|---|---|---|---|---|---|
| moist sand | 20 | 30 | ~0.6 $10^{10}$ | ~1.33 | ~120 |
| dry sand | 2 | 10 | ~1.5 $10^{10}$ | ~0.33 | ~300 |

It is therefore essential to measure the specific travel time ($T_1-T_0$) 22 between the transmitter and the receiver and open the gate of the receiver only after ($T_0-\Delta T_0$), accept the attenuated electromagnetic radiation only for a specific time window of $\Delta T_0$ 22a, and stay shut for time T until all scattered radiation dies out. This strategy enables to reject radiation that reaches the receiver by going around the air cavity, as it takes more time $T \gg T_0$. Limiting the pulse width to the necessary minimal number of cycles $\Delta T_0$, and opening the receiver only between $T_0(D)$ and ($T_0-\Delta T_0$), helps reduce the scattered radiation and improves signal to noise ratio.

The practical limit of working in the time domain depends on the inherent noise of the receiver antenna. While scattering and time dependent sources of "noise" may be limited by the above "least time" methodology, there are many sources of noise relative to the antenna electronics, the physical environment surrounding the antenna and its temperature that all contribute "noise" and effectively reduce the maximal distance between the transmitter and receiver.

The signal-to-noise ratio is also increased by correlating the phase of the oscillator that triggers the power amplifier 17 that feeds the transmitter antenna 24 with the gating time of the preamplifier 28 of the receiver antenna 27 so that only radiation at the same or no more than 10° phase difference will be accepted. Radiation that may have scattered on its way to the receiver and therefore suffered a phase change, will automatically be eliminated. The Phase Locked Loop (PLL) 26 rejects signals that arrive at different phases than the initial radiation wave transmitted by the transmitter antenna, obviously due to some scattering on their way from the transmitter antenna to that of the receiver. In FIG. 5 the direct route of an electromagnetic wave propagating at 50 MHz in a non-magnetic soil ($\mu=1$), with a conductivity of ($\sigma=5$ mS/m) and a relative permittivity ($\epsilon_r=30$) is illustrated. The wavelength of such a wave in air is ~6 m and is reduced in the soil to ~1.1 m. Thus the 50 m distance 22 equals 45 wavelengths ($\lambda$) and the speed in such a soil given by $V=c(\epsilon\mu)^{-2}$ is 6 nsec/$\lambda$ or 273 nsec/50 m. A route 26 between the transmitter and the receiver that passes at 1 m over the top of the presumed air cavity, which is, presumably, 2 m high, is 16 cm longer or in terms of the 1.1 m wavelength, has a 26° phase delay. Consequently a PLL circuit set to discard any electromagnetic wave with phase difference of 10° or more for example, will eliminate scattering events that take long routes, although they may reach the receiver within a time window of 5$\lambda$=30 nsec.

The third requirement for maximizing the (S/N) ratio is to match the polarization of the transmitted electromagnetic wave to the long direction of the presumed air cavity, so that its interaction with it, is maximized thus increasing the signal attenuation. On the other hand, the receiver is also set to accept only waves with the original polarization, so that in any case of interaction with the soil that changes polarization, the original polarized wave will not pass through the polarization filter of the receiver which may be in the form of a grid of metallic thin parallel wires.

The three tools, narrow transmitter pulses, phase locked loop between the transmitter and the receiver and the Polarization filtering, practically eliminate all the transmitter radiation that do not propagate in "Straight Line" towards the receiver. While this regime improves S/N it also reduces the absolute signal magnitude. However in order to reach the maximal distance between the transmitter and the receiver, we only have to integrate the events reaching the receiver until all the "non-straight-line-noise" dies out and repeat the same exercise in the time domain again and again, until the cumulative coherent signals, reach the minimal sensitivity level of the receiver.

As the minimal sensitivity of the receiver is mainly determined by the Johnson noise which is random, repeating the signal N times, will improve the $S/N_{receiver}$ ratio by $N^{1/2}$ until the minimal sensitivity level of the receiver is crossed and the preamplifier of the receiver is triggered. Consequently, it is possible to place a reduced size power amplifier 17 close to the transmitter antenna 25. To attain the fast switching capabilities, the power amplifier 17 may be composed by an array of supercapacitors that can be switched by Ga(N) fast switchers.

As any air pocket between the transmitter and the receiver will cause strong reflections and reduce the effective power of the transmitter, it is highly important to affix both the transmitter and the receiver to the soil by intermediate materials that have permittivity and conductivity matching or as close as possible to that of the soil. Materials and powders that have a wide range of permittivity are available. (see for example www.eccosorb.com). As the radiation on its way from the transmitter to the receiver has to traverse the tube and the airy space between the tube and the borehole, it is essential to select a tube that has a permittivity as close to that of the soil. As the dielectric constant of PVC is between 3-4.5 a PVC tube is a good choice for low permittivity soils such as dry sand. The space between the tube and the soil has to be filled with suitable material such as one of the eccosorb powders that can be tuned to a median permittivity ($\in_r$) between the tube and that of the soil.

It is also essential when digging the two boreholes to ensure that they are parallel along their entire depth and when inserting the tubes within their respective boreholes, ensure that they are equidistant at all levels; small mismatches in the distance may be corrected by inserting between the inner wall of the tube and the transmitter or the receiver, shims of the same permittivity as that of the tube and/or change the size of the bag 62 (FIG. 8) attached to the antennas.

The actual distances between the different levels of said tubes are measured after insertion in the soil, in both directions and any attenuation measurements between the tubes at different levels are corrected for distance discrepancies.

In the context of the PLL circuit, it is also essential to measure the start of the transmitted electromagnetic pulse and its power, at the point of contact with the soil and not rely only on the phase of the oscillator and the Power amplifier data. To this end a small power sensor 25a at the edge of the capsule 57 that is triggered with every pulse provides the correct timing of the start of the electromagnetic pulse and its magnitude.

As the specific antenna's input impedance may be different than that of the power amplifier, an impedance matching component, a balun may be needed, in-between.

Figure 6:
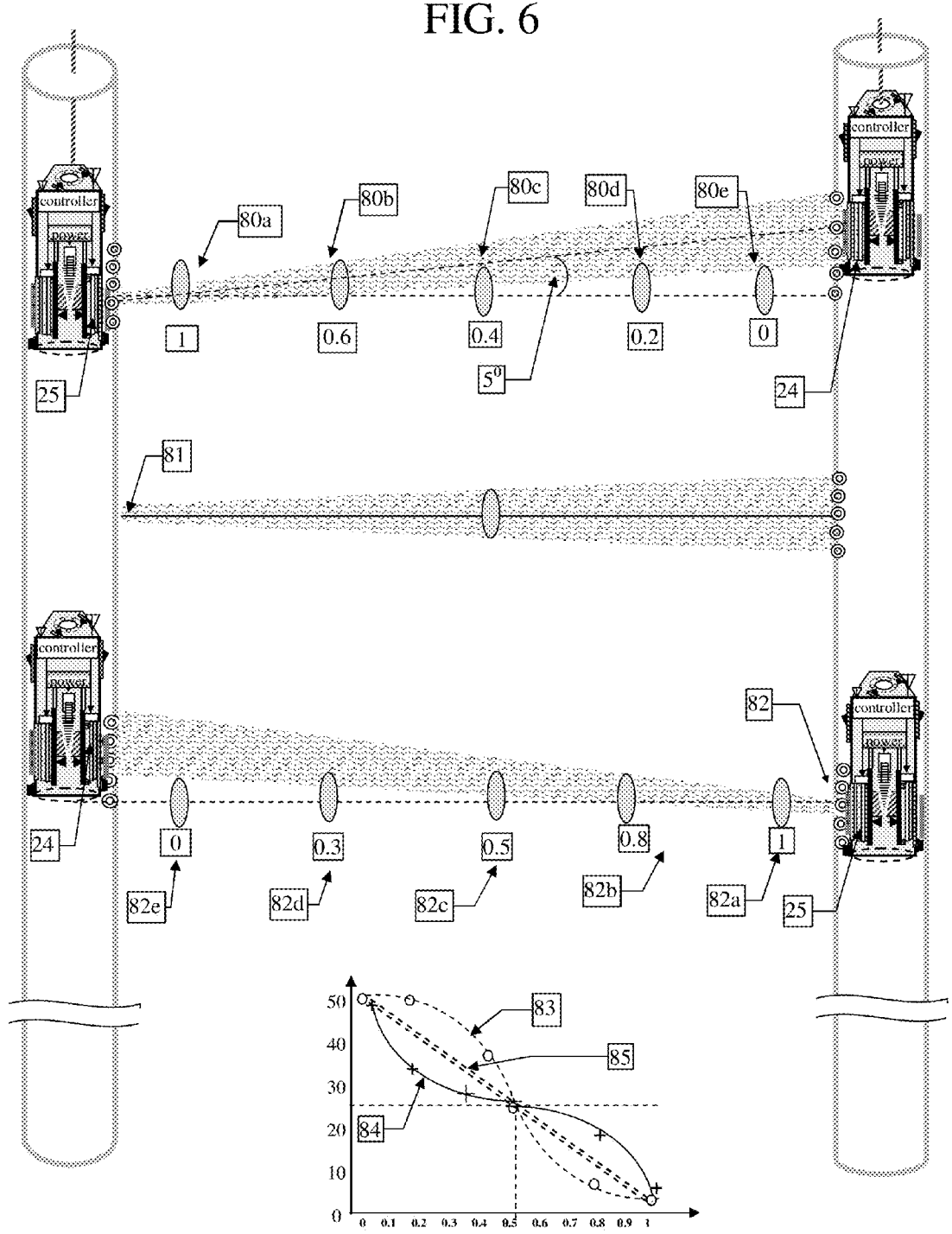
FIG. 6 illustrates a method for finding the lateral location of a cross-section of an air-cavity between the two tubes, by measuring transmission between a transmitter at one level and corresponding receivers below and above that level at the adjacent tube, from two directions.

FIG. 6 illustrates a method for finding the specific location of a small air-cavity between the transmitter and the receiver. When the section of the soil between the transmitter and the receiver is not uniform, the scattered radiation that reaches the receiver may be different depending at which side the receiver is. Although our methods of measurement requiring PLL, limited pulse length smaller than the transition time and horizontal polarization, aim to reduce scattered radiation ($I_S$), the measured signal intensity is still partly due to scattered radiation that doesn't cross the air cavity $I=I_D+I_S$. Consequently it is beneficial to verify the measurement by changing the relative positions of the transmitter and the receiver and recalibrating the measurements of previous levels. Turning the "dual-antenna" capsules by 180° at both ends of the transmission path, not only reverses the roles of the antennas, but also recalibrates the entire chain of measurement as all the components, from the microcontrollers, to the depth measuring sensors and the power supplies, are all different. It is also essential to verify that the transmitter and the receiver are indeed facing one the other by using the push-pull solenoids 42a and 42b illustrated in FIG. 8 and the rotation piezomotors 34a and 34b to confirm the previous measurement, up to a small uncertainty error level. This recalibration process is repeated for several depth levels until the drop in transmission intensity at the "presumed air cavity level" is confirmed with certainty, much above the recalibration error stemmed from changing the transmitter/receiver roles.

A 2 meter high tunnel in the middle of the 50 meter long patch of soil represents approximately a 5° high object from both ends.

The actual place of the small air cavity between the transmitter and the receiver may be estimated by slightly changing the average direction of the transmitter and measuring the transmitted radiation by the receivers above and below the same level receiver. Slightly increasing the inclination of the transmitter 25, by 5°, will still detect a cavity 80a close to the transmitter but will miss it, if the small air cavity 80e was close to the receiver, with intermediate blocking of the radiation at intermediate distances. The expected attenuation as a function of the distance from the receiver is shown under the figures representing the air cavities.

Changing the roles of the transmitter and the receiver gives the opposite results; increasing the inclination of the transmitter 25 by 5% will detect the cavity 82a close to the transmitter and will miss the cavity 82e close to the receiver.

Charting the place of the air cavity along the distance between the tubes, as a function of the place of attenuation measured by the receiver, results in two non-linear relations 83 and 84 depending on the direction of transmission. However the average of the two non-linear relations 85 is a linear relation between the probable place of the air cavity and the average attenuation measured from the two opposite ends of the path, between the two tubes.

Figure 7:
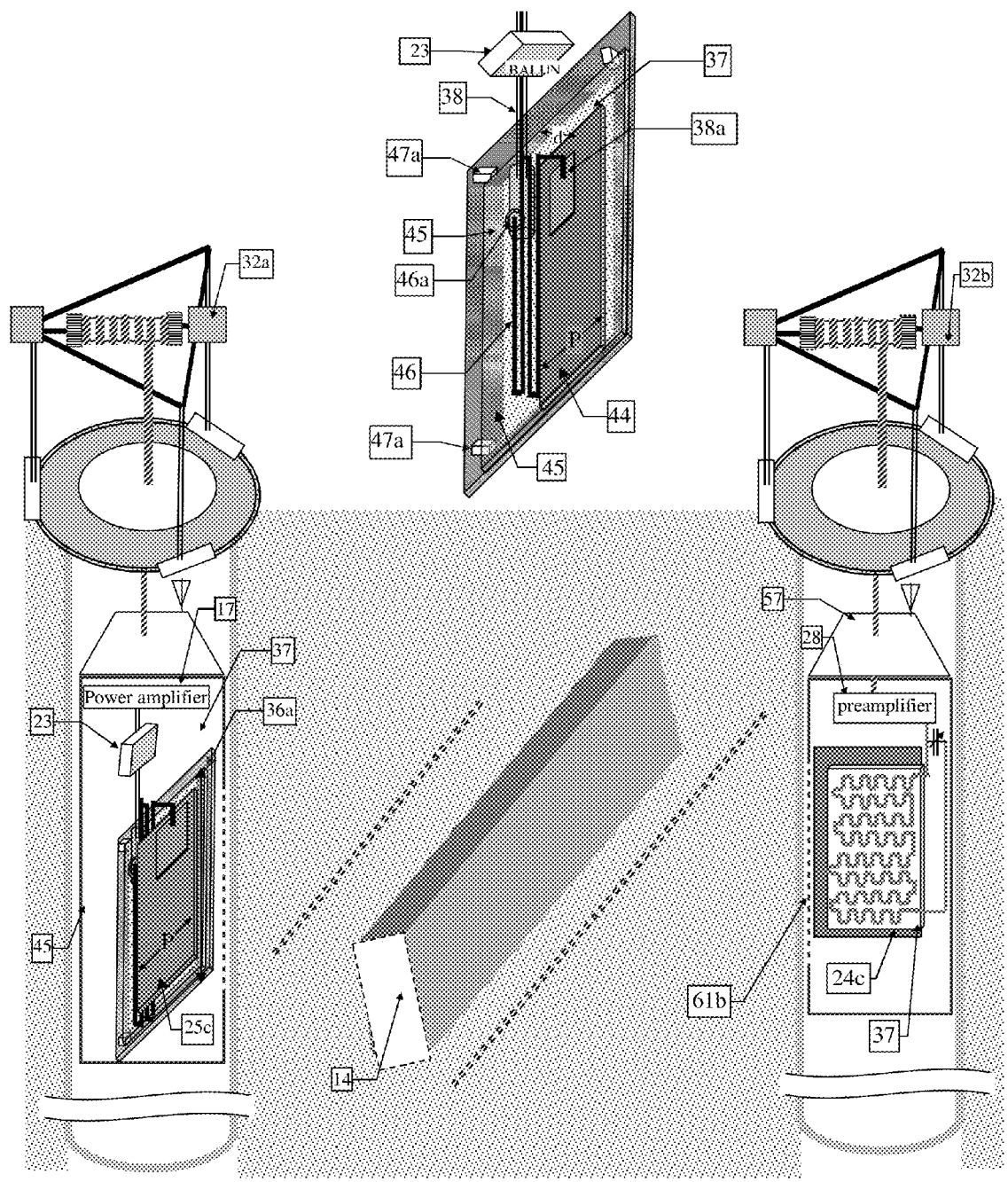
FIG. 7 illustrates the structure of a low frequency modified narrow band antenna, whose frequency may continuously be modified in small steps and a corresponding meander-lined receiver.

FIG. 7 illustrates an antenna which is a variation of the narrow-band micro-strip patch antenna, modified in order to achieve a smaller size, than a regular patch antenna, that for a frequency of 50 MHz and a dielectric constant of ~1.5 to 2 ($\lambda \approx 3$ m) would be too large to put it in a tube, even if the dimensions were of the order of ¼ $\lambda$.

The changes required in order to reduce the size of the antenna are:

1—a layer of large permittivity between the radiating surface and the ground that reduces the major dimension by $(\in_r)^{1/2}$ and, 2—increased radiating length, by adding a "meander line" between the radiating plane and the ground.

Other than reducing the size of the antenna, there is also a need to be able to change continuously or in small steps, the resonant frequency of the antenna, in order to comply with the changing resonant frequency of the soil from one layer to another or in time, due to weather and temperature changes. The reduction of the size of the microstrip patch antenna may be achieved by coating the back of the patch with a high dielectric constant material such as $TiO_2$ (rutile) 37 with $\in_r=150$ or Barium Titanate with $\in_r \approx 1250$. However the high permittivity coating increases the energy stored in the antenna and effectively slows the rise-time and decay time of the discharged pulse; consequently there is an optimal thickness coat of high permittivity material that has to be determined experimentally.

The frequency of the micro-strip patch antenna with the desired dimensions may continuously be tuned from 41 MHz to 51 MHz by changing the actual dielectric constant between the radiating surface 44 and the ground 45, for example from 150 to 100 as illustrated in the following table 4. The change of the dielectric constant may be achieved by moving the ground surface 45 forward, closer to the patch, thus causing the portion of the gap initially filled with air to diminish and contribute less to the average permittivity of the region between ground and the radiating surface. The mechanical reduction of the distance between the ground and the radiating surface, may be achieved, for example by piezoelectric motors 47a that have an accuracy down to 1 µm.

TABLE 4

| L(mm) | W(mm) | d(mm) | $\epsilon_r$ | f (MHz) |
|---|---|---|---|---|
| 300 | 150 | 2 | 150 | 41 |
| 300 | 150 | 2.5 | 120 | 46 |
| 300 | 150 | 3 | 100 | 51 |

Reducing the distance between the patch and the ground may also be achieved using electroactive polymers that may shorten their size under an electric field.

The actual size of the antenna may further be reduced by "increasing" the radiating surface, by a "meander line" 46 between the patch and the power line 38, with a toroid in-between that further lengthens the route to the ground. The impedance of the patch antenna may be controlled by judiciously selecting the feeding line place 38 on the patch. An impedance mismatch between the power line 38 and the radiating antenna 25 may be bridged by a balun 23.

FIG. 7 also illustrates the positioning of the transmitter antenna that has a linear polarization. Given the geometry of the presumed elongated air cavity, it is beneficial to select an antenna with horizontal polarization 35 and position it in the same plane as the long direction of the air cavity, as this geometry offers a higher probability to interact with the air cavity 14 than a vertically polarized wave. In addition, if the receiver antenna too, is linearly polarized and positioned with its horizontal polarization in the same plane as that of the transmitter, any scattering of the transmitted radiation will change its polarization and thus enable the receiver to reject this scattering event. The selection of an horizontal polarization at the receiver may be done by placing a metallic grid with horizontal wires.

The receiver 24c illustrated in FIG. 7 is similar to the transmitter 25, other than its entire radiating surface 37 is a meandered-line coated by rutile and the distance from the ground may be changed using piezo-electric nano-motors, thus enabling to change the resonant frequency.

FIG. 8 illustrates an elevator-like mode of transporting the transmitter and/or the receiver inside the tube inserted into the ground, using a winch 32a to lower a capsule 57 attached by cable 64 to the winch, to the desired depth, where the transmitter and/or the receiver may be activated to measure the soil's transmission. The capsule 57 position is controlled by a micro-controller 33; the steel cable 64 may also incorporate electrical wires supplying power needed for the electrical and electronic modules within the capsule and recharging the supercapacitors inside the power supply 17 that have to be recharged after every pulse of the transmitter. Data communications between the microcontroller that controls the winch 33 and the internal microcontroller 60 of the capsule that controls the transmitter, receiver, and other modules is by wireless.

The steel cable holds the capsule 57 through a plate resting on ball bearings 58. The capsule has the ability to turn around by 180°, using rotary piezoelectric motors 34a and 34b or by turning around the winch that also rests on rails 6. The angular rotation is needed in order to turn the transmitter or receiver towards the neighboring tube and its antennae in any direction. This is an important feature as the other tubes position is determined by the geography of the terrain and can be in any direction. Electrically activated push-pull solenoids 42a, 42b attached to the external walls of the capsule may change its inclination in order to better face a corresponding antenna at a different level, on an adjacent tube or as explained in conjunction with FIG. 6, for establishing a "straight-line" radiation link between different levels of different tubes.

The transmitter antenna 24 and the receiver antenna 25 are attached to plates 41a and 41b respectively and have pads 62 attached to their faces. Said plates that are off-center of the capsule, can move the transmitter and receiver towards the walls of the tube and in the process press the pads 62 to the walls of the tube; this mechanism ensures that the radiation of the antennae will reach the soil through materials that have dielectric constants close to the soil and will not be reflected by the air/soil interface.

The resonant frequency of the transmitter and the receiver are controlled by piezoelectric nano-motors 47a attached to the plates 41a and 41b that control the airspace between the ground and the dielectric coating layer applied to the back of the radiating patch of the antennae.

The lateral movement of the plates 41a and 41b may be produced by a variety of electro-mechanical means, including an electrically activated 59 conical screw that, as illustrated, translates its vertical advance into a lateral movement of the plates and thus pushes the transmitter and receiver pads. This movement of the transmitter and receiver towards the grilled window 61 may also be accomplished by dedicated piezoelectric motors.

The tube is preferably composed of two materials: an external shell 55 of PVC that is in contact with the soil and a series of internal strips of preferably stainless steel 56 that strengthen the tubular structure, at sections above and below the antennae positions that have "windows" 61 in the form of a grid of parallel wires 61 that let the linear horizontally polarized radiation pass, while blocking the vertically polarized radiation, if any. The wire grid may be part of the stainless steel strips or inserts into the continuous PVC tube. Preserving the emitted or received radiation to be horizontally polarized is an important feature of the system that improves signal-to-noise ratio and consequently increases the transmission reach of the radiation.

FIG. 8 also illustrates another mode of locomotion of the transmitters and receivers along the tube on rails 66 affixed to the interior of the tube and moved by linear motors 66.

Figure 9:
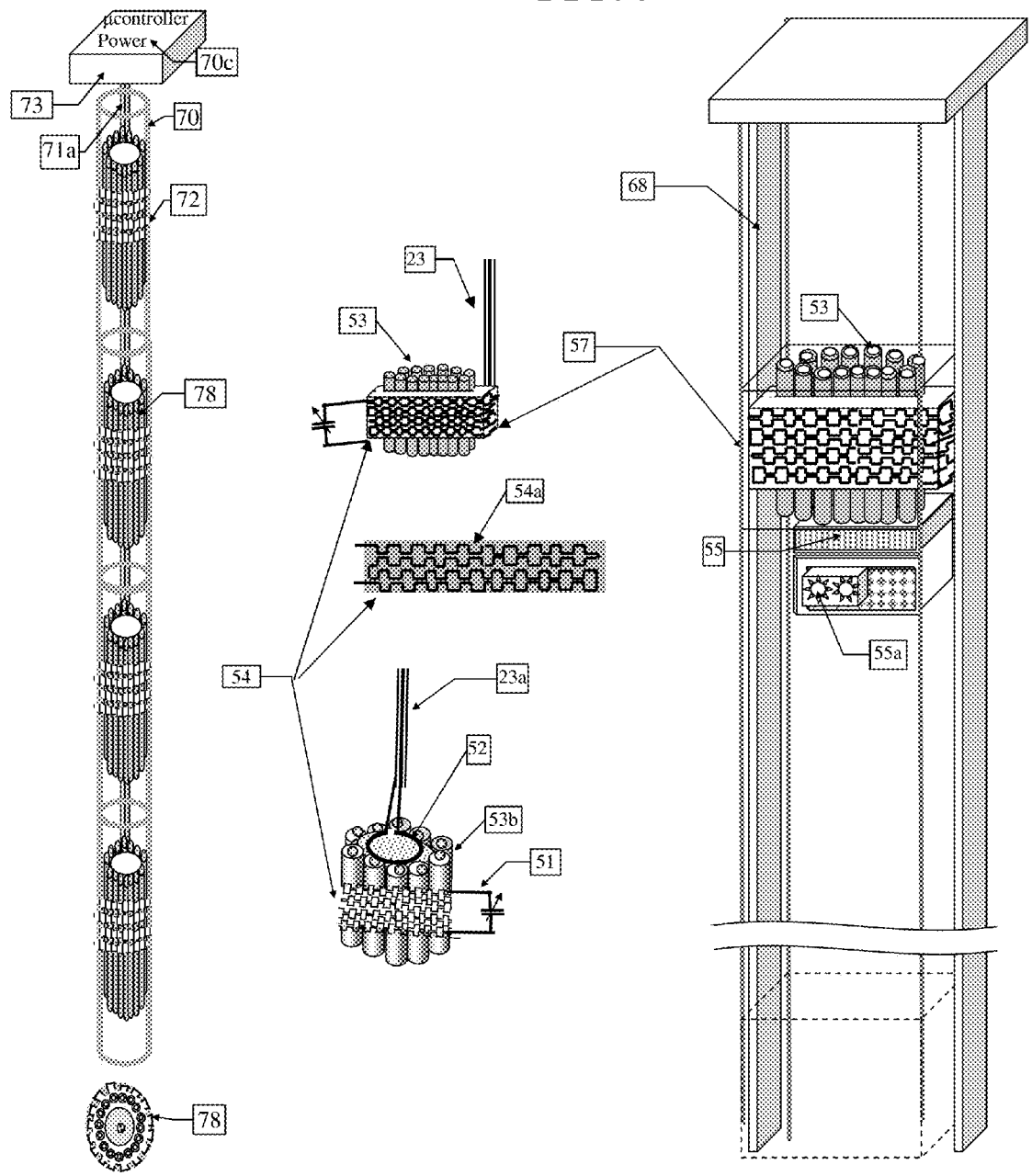
FIG. 9 illustrates a very low frequency antenna based on multi-coiled meandered loops, wound on a circular array of ferrite cores; it also illustrates a wide tube whose surface is wound with meander-lined loops and an array of soft ferrite rods inside the tube of rectangular cross-section.

FIG. 9 illustrates a very low frequency magnetic antennae 50a and 50b consisting of meandered loops 54 around rods 53b that get magnetized when current flows in the meandered loops. This structure evolves from the classical magnetic loop antenna that consists of loops coiled around a ferrite rod. Meandering the high conductivity loop 54 increases its length and effectively the wavelength radiated by the loop; consequently the physical dimensions of the ferrite rods 53b support much larger wavelengths than the classic small loop antenna and increases its radiation efficiency, thus heating less. The soft ferrite rods may be from a MnZn alloy or a nano-crystalline alloy of $Fe_{91}Zr_7B_3$ that has a low resistivity of ~45 µΩcm. as compared with the resistivity of MnZn alloy of 100 Ωcm, and therefore heats less.

The meander-lined copper coil is wrapped over a layer of high permittivity material 54a such as rutile that increases its effective wavelength. An attached tunable capacitor 51, forms together with the loops an LC circuit, which may be resonant at the desired frequency, taking in account the increased length of the meandered coil and its increased permittivity. The soft ferrite rods surrounded by the meandered coils get magnetized at the same frequency and hugely amplify the radiation of the loops. It is critical that the ferrite structure may follow the change in magnetization, dictated by the frequency of the loop; thus it is critical to check the radiation magnitude at the desired frequency and optimal wavelength.

In spite of the lengthening of the wavelength by meandering the loop, and separating the ground by a high permittivity coat 54a, the antenna may not resonate and the ferrite rods may heat.

In this case the ferrite rods 53 may be cooled by heat pipes 55 that circulate low temperature evaporation liquid such as Freon through the internal holes of the ferrite rods and carry the evaporated gas through heat sinks topped by ventilators 55a that circulate and disperse the heat away. The liquefied freon is then returned to cool the ferrite rods.

In addition to the forced cooling, as the antennae in the system are planned to radiate in a low duty cycle for example of 1:100, they have time to cool during the non-radiating time.

While the relatively small dimension of the magnetic antenna results in a small efficiency, the number of loops and specially the ferrites enables to radiate the necessary power, while keeping the heating of the ferrite plate, rods and coils under control.

The electric field (E) of the loop antenna is in the direction of the plane of the loop and is sensitive to incoming radiation also from said plane direction. Therefore suitable reflectors behind the loop will reflect the backward radiation onto the front and increase the radiation emitted forwards. The polarization of the loop is horizontal, in the plane of the loop, as desired in our application to better impact the horizontally extended bodies.

A circular loop antenna may be connected to the power source through a small coil 52 for matching impedances. Heat tubes inside the ferrite rods and plates may reduce the heat of the ferrite core. The magnetic loop transceiver may be used for frequencies smaller than the micro-strip patch antenna described above for the 40-50 MHz range.

Circular multi-loop antennas 72, 72a may be inscribed onto the walls of plastic tubes 70 to be inserted vertically into the ground. The loop antennas may be meander-lined and maybe concentric with the tubes 70 and inscribed on the walls of the tube along its vertical direction. This feature naturally eliminates the air gap between the antenna and the internal wall of the tube that may cause undesired reflections. The tubes are preferentially made of plastic compounds that have a high permittivity of 3-5 and be able to withstand relatively high temperatures caused by the loops of the antennae. Another option is to use a stainless steel tube 69 coated with a thick overlay of plastic material such as PVC onto which the loop antenna coated with a high dielectric material such as rutile, is inscribed. The loops of the antenna inscribed in plastic have a very high conductivity and may be composed of copper, silver or derivatives of graphene or stanene. The ferrite rods that magnify the transmitted the radiation are placed inside the plastic tube concentric to the loops; the loops get power through a cable 71a attached to the walls of the tube.

FIG. 9 also illustrates a wide antenna 57 comprising cooling mechanisms, 55, 55a that can be moved to any depth by an elevator mechanism 68. Wide antennae transmitting horizontally polarized electromagnetic waves have a larger probability to interact with passageways that extend along the width of the antenna.

Figure 10:
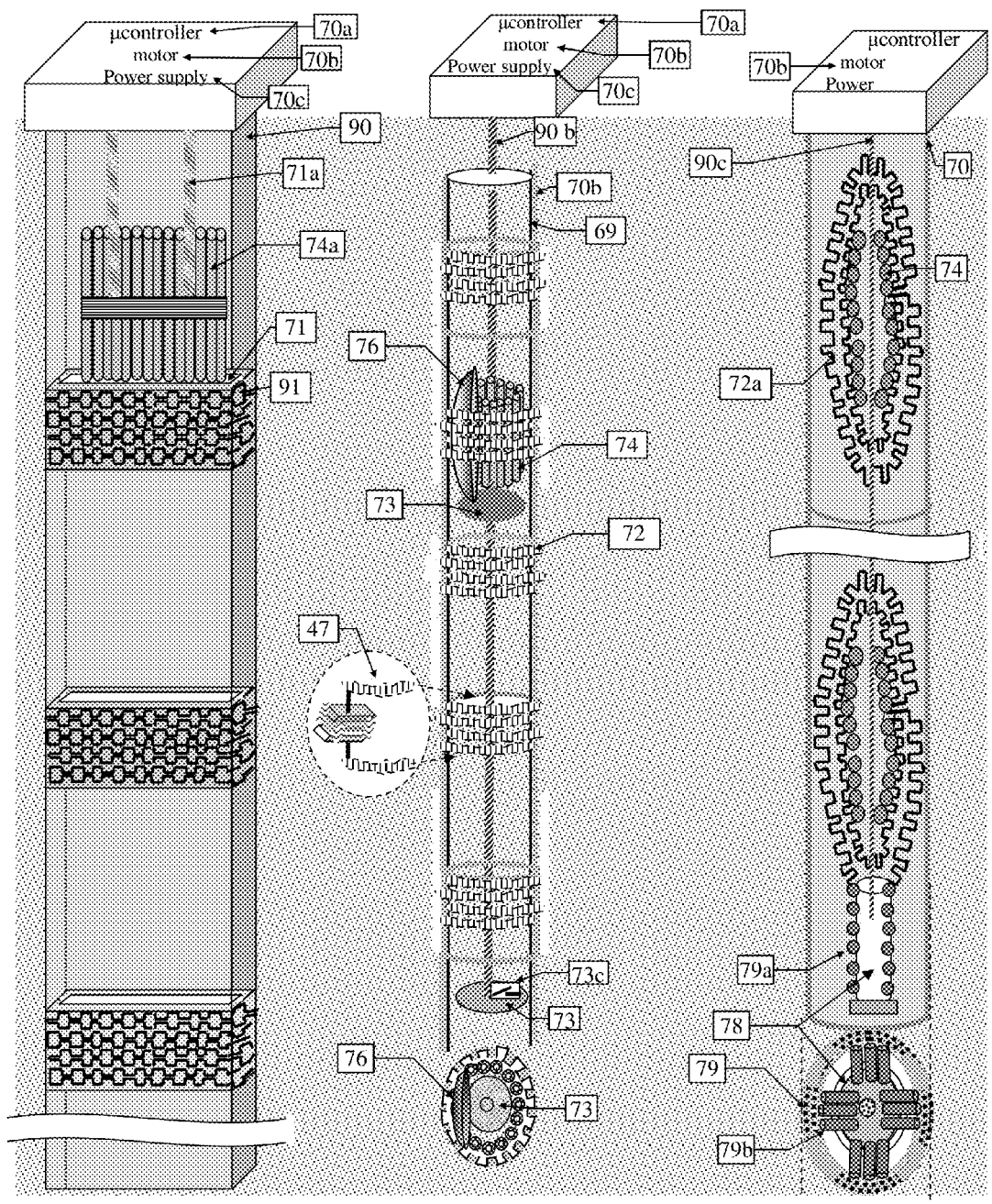
FIG. 10 illustrates circular multi-loop antennas inscribed onto the walls of plastic tubes of circular or rectangular cross-sections, wherein arrays of soft ferrite rods may be lowered onto the space within the tubes, adjacent to the inner walls of the plastic tubes where the metallic loops are inscribed or wound on the surface of said tubes. The figure also illustrates a magnetic antenna, formed by meandered-lined loops inscribed onto the surface of the tube so that its magnetic field is vertical to the long direction of the tube.

FIG. 10 illustrates a rectangular tube 90 inserted into the soil with loop antennae formed by meander-lined conductors 91 inscribed onto the external surface of the tube, at successive depths, depending on the required resolution of the soil tomography. Soft ferrite rods 74a that amplify the transmission of the antennae are moved by a small motor 70b and inserted 71 onto the tube section inscribed by several loops.

The same mechanism is used with a narrow tube 90b where a bundle of soft rods 74 is lowered to the desired depth where a loop antenna in inscribed on the surface of the tube.

The antennas are controlled by microprocessors 70a located on a box at the top of the tube that also contain the small motor 70b that lowers down the tube a small platform 73 containing inter alia, a reflector 76 for reflecting back radiation of the loop antenna in the desired direction. The platform 73 hangs from the motor 70b sustained by a cable 71a and can turn circularly around the axis of the tube. The platform 73 carrying the bundle of ferrite rods 74 and/or a reflector 73 can position them at any depth and direction, within the loop antenna. The bundle of soft ferrite rods substantially increases the radiation of the loop antenna and the reflector redirects part of the emitted radiation at the desired direction. The power to the loop antennae is supplied by the power supply 70c situated in the box at the top of the tube and conveyed to the proper loop antenna through the central cable 90b that can reach any depth and connect to any loop antenna through a contact switch box 73c situated of the platform 73.

Alternatively the power may be supplied to the loop antennae through a power line inserted through the inner wall of the tube. The space between the meandered lines is filled with high dielectric constant material that increases capacitance to the ground and consequently further increases the electric wavelength of the antennae. Electrically variable capacitors 47a within the tube are connected to the ends of the meander-lined loops inscribed onto the plastic surface and can consequently change the resonant frequency of the loop antenna.

The loop antenna may also be inscribed on the surface of the tube with the axis of its loops 72a perpendicular to the long direction of the tube; if the bundle of soft ferrite rods 74 are also in this direction, the magnetic radiation will be amplified.

Four meander-lined loops 79 may be inscribed on the surface of the tube, each loop at 90° from the other. 4 arrays of soft ferrite rods 79a, 79b are carried on a platform 78 that moves within the center of the tube, supported by a cable 90c activated by a motor 70b, controlled by a microcontroller on the top of the tube.

The soft ferrite rods may also be placed next to the internal wall of the tube behind the loops, saving space otherwise needed for the bundle of ferrite rods carried along the centre of the tube by the platform 73. In such a configuration carrying of power to the loops and activation of the loops is performed by electronic circuits 71a attached to the walls of the tube.

There are multiple ways, to realize the invention explained above, combine the differentiating features illustrated in the accompanying figures, and devise new embodiments of the methods described, without departing from the scope and spirit of the present invention. Those skilled in the art will recognize that other embodiments and modifications are possible. While the invention has been described with respect to the preferred embodiments thereof, it will be understood by those skilled in the art that changes may be made in the above constructions and in the foregoing sequences of operation without departing substantially from the scope and spirit of the invention. All such changes, combinations, modifications and variations are intended to be included herein within the scope of the present invention, as defined by the claims. It is accordingly intended that all matter contained in the above description or shown in the accompanying figures be interpreted as illustrative rather than in a limiting sense.

The invention claimed is:

1. A system for mapping the soil using electromagnetic transmitters and receivers inserted within boreholes extending to any practical depth, wherein, the distance between said electromagnetic transmitters and receivers are maximized by operating at the local resonant frequency (f) of the soil $f=(1/2\pi)[L(\mu)C(\in)]^{-1\!/\!2}$ where the resistance is minimal and wherein, activating the transmitter for a short wavelet time "$\Delta t=(3\lambda/V)$" wherein ($\lambda$) is the wavelength and (V) the speed of the radiation in said soil, such that at least one wavelet of radiation reaches the receiver in least-time, hereinafter referred to as the straight-line distance "SLD", and wherein, the receiver stays shut for a time period equal to the propagation-time "T0" between the transmitter and the receiver, and after said "T0" time, it opens for the short time "$\Delta t$" and wherein, all events arriving at the receiver are checked for the phase shift "$\Delta \phi$" between their original phase "$\phi_0$" when transmitted, and the current one "$\phi c$", and if there is a phase difference "$\Delta \phi = \phi c - \phi 0$" larger than $\phi$min, they are not given access to the receiver, and wherein, the polarization of all the events arriving at the receiver are passed through a mechanical polarization filter tuned to the same linear polarization, when emitted by the transmitter, so that events with a different polarization are eliminated, and wherein, both the receiver and the transmitter wait for several "T0" periods, hereinafter referred to as an "nT0" period, where (n)>(nmin), until all events detected by the receiver subside, and wherein, the sequence comprising, the transmitter transmitting for $\Delta t$ period, followed by the receiver waiting for "T0" period and opening for a "$\Delta t$" period and shutting back, and then waiting for "nT0" period, is repeated "m" times, until the cumulative "Straight-Line" events overcome the random noise of the receiver and consequently reach the minimal sensitivity level of the receiver and trigger it, and wherein, the maximal distance between the transmitter and the receiver at which the receiver is triggered according to the above procedure, is referred to as the maximal "SLD".

2. The system for mapping the soil using electromagnetic transmitters and receivers inserted within boreholes as in claim 1 wherein, tubes extending to any practical depth, are inserted into their respective boreholes wherein, said tubes and the space between them and the soil, are filled with material that have a composition in terms of conductivity ($\sigma$), permittivity ($\in$r) and permeability ($\mu$), close to that of the soil, so that the electromagnetic radiation traversing the tube walls and the space between the tube, the transmitter or the receiver, undergo minimal reflection and refraction and wherein, said tubes, after inserted into their boreholes, are substantially parallel in 3D and equidistant along their length and wherein, the actual distances between the different levels of said tubes are measured after insertion in the soil, in both directions and any attenuation measurements between the tubes at different levels are corrected for distance discrepancies and wherein transmitters and receivers controlled by their respective microcontrollers situated at the top of the tubes, may move within the tubes and reach any desired depth, in one of the locomotion means comprising moving along rails affixed to the internal walls of the tubes and, transported within capsules to any desired depth by a winch, wherein, said microcontrollers may change the positions in space of the transmitters and receivers within capsules, so that their optimal direction of transmission and receipt may be changed to optimize transmitters and receivers at other depth levels at other tubes to intercommunicate.

3. The system for mapping the soil as in claim 2, wherein, the soil's permittivity along parallel straight-lines across the depth of a vertical plane under the soil, is relatively uniform, and wherein, the existence of an underground passageway across a vertical plane under the soil, may be ascertained, by inserting two tubes into the ground, where each tube has both a transmitter and a receiver, at the two sides of said vertical plane, wherein, the transmitter and receiver in each tube may exchange positions within their respective tubes so that the direction of the radiation is inversed and wherein, said transmitters and receivers face each other so that the transmission radiation is maximized and approximately equalized in both directions and wherein, the frequency of the radiation in the 10-100 MHz band where the attenuation in the soil is given approximately by $\delta=2/\sigma(\in/\mu)^{1/2}$ where $\delta$ is the distance where the attenuation is (1/e), is selected by the optimal wavelength that maximizes interaction with the target object, and wherein, a Straight-Line attenuation map of all levels of said vertical plane is built using a transmitter in one tube and a receiver at the same level in the second tube and vice versa exchanging the roles of the transmitter and the receiver and wherein, the straight-line attenuation at a given depth level is the average of the attenuation measured from both sides and wherein, the average level of an air cavity is the level whose attenuation is the highest and the attenuation both at levels below and at higher levels, are the same or lesser than the attenuation at the level of the highest attenuation in-between the two tubes, in both directions and wherein, the lateral position of the air cavity between the two tubes is found by measuring the attenuation between the level of the air cavity at one tube and the respective levels above in the second tube, and vice versa after exchanging the direction of the radiation, the attenuation between the level of the air cavity in the second tube and the respective levels above the level of the air cavity in the first tube and wherein, the lateral position of the air cavity along the Straight-Line between the tubes is a non-linear function of the attenuation along the straight-lines between the air cavity level transmitter in one tube and the receiver at the level above it in the second tube, and wherein, said lateral position of the air cavity along the Straight-Line between the tubes may be determined by taking the average level of attenuation as a proportion of the increased attenuation from the highest attenuation level in one tube to one or more levels higher at the opposite tube, when measured in the two opposite directions.

4. The system for discovering underground passageways in a relatively uniform soil, as in claim 3, wherein, tubes where the transmitters and receivers are located, follow a substantially triangular meandering route, with approximately 70% of maximal SLD between the tubes and wherein, the direction in 3D of an underground passageway that crosses more than one of the intertube routes, may be determined by parallel-line scanning the soil between the tubes and wherein, the 3D direction of passageways may be determined from its 2D cross sections determined from the 2D parallel line maps of the planes between tubes.

5. The system for mapping the soil as in claim 2, wherein, couples of transmitters and receivers are installed back-to-back in a tube, all along the tube, at intervals equal in length to a part of the height of the searched tunnel, wherein said receivers and transmitters are positioned in 3D so as to face specific transmitters and receivers at the same depth, in a specific neighboring tubes and wherein, said transmitters or receivers are oriented within their specific tubes so that their horizontal polarizations are in a plane perpendicular to the direction of the tube and wherein, said transmitters and receivers get their power through a cable that runs all along the length of the tube and may be switched on and off separately, and wherein, said transmitters and receivers receive their operational instructions from a microcontroller located at the top of the tube, by cable or wireless communications.

6. The system for mapping the soil using electromagnetic transmitters and receivers inserted within boreholes as in claim 2 wherein, the soil is not uniform to such a degree, that there are many substantial attenuation discontinuities across parallel straight-lines along the depth of the tubes, in which case a full tomography reconstruction of the plane is preferable, in order to delineate the shape of the various layers of the soil with large permittivity discontinuities, and air cavities if any, and wherein, the radiation transmission between every single transmitter $(n_i)$ along tube (i) and all $(n_j)$ receivers at (nj) consecutive levels at the opposite tube (j), are measured in both directions, resulting in $2(n_{i,j})$ straight-lines, crossing $(ni,j)^2$ pixels of an area between the tubes, where $n_i$ and $n_j$ are the antennae coordinates along tubes (i) and (j) and $d(n_{i,j})$ is the distance between consecutive transmitters as well as the distance between consecutive receivers and wherein, the distance D between the tubes is smaller than approximately 70% of the maximal distance of transmission (SLD) and wherein, at high conductivity and in a non-magnetic soil, the velocity in any pixel $vp=(\in p)^{1/2}$ and the time to traverse any pixel in any direction may be expressed in terms of the permittivity, as the measurements of the Straight-Line-distance and time to traverse said distance are known, and wherein, all Straight-Line measurements are recalibrated for change of directional sensitivity of antennae and wherein, the permittivity of any ill defined pixel, due to the lack of sufficient number of independent equations related to said pixel, may be defined by assuming that the permittivity of this pixel to be, the weighted average of the permittivity of all the surrounding pixels and wherein, the permittivity map of a $D(ni,nj)^2$ region within the plane determined by the 2 tubes may be determined by solving the $(ni,j)^2$ independent equations using algebraic reconstruction tomography algorithms with the $[(ni,j)^2(\in r)]$ unknowns by finding the inverse of the matrix of the weight coefficients by iterative methods.

7. The system for mapping the soil using electromagnetic transmitters and receivers inserted within boreholes as in claim 6, wherein, the mapping of the plane between 2 tubes is performed in successive steps by mapping overlapping square $(n_{ij})$ regions, starting with a first region bordering with the soil wherein, the permittivity of any ill defined pixel in a region bordering with a previously mapped region is copied from previously mapped region that is well defined.

8. The system for mapping the soil using electromagnetic transmitters and receivers inserted within boreholes as in claim 2, wherein, in order to ensure that there are a sufficient number of independent equations relating all $(n^2)$ pixels between the two tubes, a transverse tube housing (n) transmitters and (n) receivers is placed on the soil surface, along a line connecting the tops of the 2 tubes inserted in the soil that define the plane whose tomography is to be mapped and wherein, said transverse tube carries an inflatable bottom bag that may be filled with the specific soil over which it operates wherein, said inflatable bottom bag is inflated in order to establish good contact with the surface over which it stays, in order to impede reflections from the air between the soil surface and its transmitters or receivers, and wherein all Straight-Line measurements are recalibrated for change of directional sensitivity of antennae and wherein, said transmitters and receivers exchange radiation with the (n) antennae along each of the tubes, from (n) positions on the ground between the 2 tubes and wherein, the $(n_{i,j})^2$ pixel array between the tubes, is traversed by $2n^2$ additional Straight-Lines that augment the number of independent equations to $3n^2$, thus satisfying the number of independent equations needed, for mapping the (n)×(n) region between the tubes using an algebraic reconstruction tomography algorithm.

9. The system for discovering underground passageways in a non-uniform soil, as in claim 8 wherein, tubes where the transmitters and receivers are located, follow a substantially triangular meandering route, with approximately 70% maximal SLD between the tubes and wherein, the full map of the inter-tube planes are reconstructed using an algebraic reconstruction algorithm and wherein, the direction in 3D of an underground passageway that crosses more than one of the intertube planes, may be determined by correlating the 2D regions having a permittivity $\in_r=1$, in the reconstructed inter-tube maps.

10. The system for mapping the soil as in claim 9 wherein, the tube has a rectangular cross section, wherein, the meander looped antenna is wound around a thin rectangular shaped thin core containing an array of ferrite rods with circular holes traversing the lengths of said rods, and wherein, said ferrite rods are cooled by a heat exchanger that circulates a low temperature evaporation liquid, in a closed loop with a heat sink that liquefies back said 295 liquid, and wherein, said antenna may be transported to any depth along the rectangular tube by an elevator-like mechanism.

11. The system for mapping the soil as in claim 9 wherein, magnetic antennae composed of meander-lined elliptic looped coils of several lateral rounds inscribed on the surface of the tube, and wherein, the axial direction of said loops is perpendicular to the longitudinal direction of the tube and wherein, 4 loops, each facing the 4 directions at 90° of the other, are inscribed on the surface of the tube and wherein, a circular platform supported by a cable unfolded by a motor on top of the tube may reach any level within the tube, wherein said motor is controlled by a microcontroller on the top of said tube and wherein, said platform carries 4 bundles of soft ferrite rods, each bundle perpendicular to the other and wherein, said ferrite rods are positioned behind the elliptical meander-lined loops inscribed on the surface of the loop and wherein, said magnetic loop antenna impervious to changes in permeability and conductivity may be used as short range underground antennae.

12. The system for mapping the soil using electromagnetic transmitters and receivers inserted within tubes as in claim 2, and mobile transmit/receive electromagnetic antennae on wheels that move on the ground, thereinafter referred to as "mobile scanners", and wherein, said transmit/receive antennae may be directed in the directions of respective antennae located within tubes, and wherein, said mobile scanners carry inflatable bottom bags that may be filled with the specific soil over which the specific mobile scanner operates and inflating it before it transmits or receives radiation in the direction of the antennae in one of the tubes, so that any reflection from the soil surface is minimized and wherein, the exact positions of said mobile transmit/receive antennae are determined by various sensors, including high resolution GPS receivers and wherein, said mobile scanners transmit and receive radiation from each of the (n) antennae along each of the tubes, from (k,l) positions on the ground between the tubes and wherein, the volumetric voxel array between the tubes, is traversed by (m) additional Straight-Lines that augment the number of independent equations needed to solve the equations, specifically in the region close to the soil surface and wherein, all Straight-Line measurements are recalibrated for change of directional sensitivity of the antennae and wherein, the total number of equations formed by 2 tubes and the mobile scanner scanning the line between the 2 tubes at (n) number of steps, is $3n^2$, for an area of $n^2$ pixels, and wherein, the total number of equations formed by 3 vertical tubes and a mobile scanner covering the triangular area of $(n^2/2)$ between the 3 tubes, for a volume of $n^3/2$ voxels, is $1.8\,n^3$, and wherein, the total number of equations formed by 4 tubes and the mobile scanner covering the area of $n^2$ pixels between the 4 tubes of volume of $n^3$ voxels, is $n^3$, and wherein, the combination of underground structures defined by 2, 3, and 4 tubes and a mobile scanner enable to form a number of independent equations larger than the minimal number of equations needed to determine the values of the voxels within the region between the tubes and the mobile scanner for mapping said regions using an algebraic reconstruction tomography algorithm.

13. The system for mapping the soil as in claim 12, for mapping the soil layers close to the surface, one layer after the other, using at least 2 mobile scanners wherein, a decision may be made whether the mapped area is suitable for inserting a long tube containing antennae along its length wherein, said mobile scanners, located at a mutually short distance, transmit in unison short electromagnetic pulses into the soil, in directions that overlap at an approximate depth roughly determined by the time-window of the back-scattered radiation detected by the receivers of said mobile scanners in unison, and wherein, changing the directions of the radiation transmitted in unison by both mobile scanners, the time-window for detecting the back-scattered radiation, and appropriately increasing the intensity of the radiation in order to compensate for the increased distance of the following layer, and wherein, repeating said process above, enables to measure the density of consecutive layers where said tube is to be inserted until such depth that the soil around the tube may be mapped using the antennae within the tube and one mobile scanner.

14. The system for mapping the soil using electromagnetic transmitters and receivers as in claim 12 wherein, said transmit/receive antennae are located within one tube whose length is 70% of the maximal SLD hereinafter denoted as (L) and wherein, said electromagnetic antennae may be directed in the directions of respective antennae located within one or more mobile transmit/receive antennae on wheels, that move on the ground, and wherein, all Straight-Line measurements between the antennae in the tube and the mobile antennae are recalibrated for change in the directional sensitivity of said antennae and wherein, the volume of the soil cone around the tube that can be imaged is $[(\pi L^2)L/3]$ and wherein the surface of the base of the cone being $(\pi L^2)$ and the height of the cone having L levels of transmitter/receivers along the depth of the tube, $[(\pi L^2)L]$ straight-line equations may be generated, 3 times the number of the needed equations to solve the values of the $[(\pi L^2)L/3]$ voxels around the tube, consequently enabling to find the values of the $(\pi L^3/3)$ voxels around the tube using an algebraic reconstruction tomography algorithm.

15. The system for mapping the soil as in claim 2 wherein, the tubes are made of plastic material that can withstand high temperatures and sections of stainless steel tubing adjoined to sections of the plastic tubing in order to strengthen the entire structure and wherein, the permittivity of the plastic material of said tube is close to that of the soil adhering to, and wherein, the tube inserted into a borehole is built modularly from sections that can be interconnected through flexible joints and enable filling the space between the borehole and each of the tube sections, gradually with material that bridge the difference in permittivity between said tube and the borehole and wherein, meander-lined loop antennas built with one of high conductivity materials comprising copper, silver, graphene and stanine derived materials are inscribed onto the plastic surface of the tubes at consecutive levels along its length and wherein, the power to the loop antennae is supplied by a power supply situated at the top of the tube through a cable affixed to the inner wall of the tube with connections through the wall to specific loop antennae and wherein said loop antennae connect to their power source through a switch that may be activated by said microcontroller and wherein, the power of the loop antenna is multiplied manifold by inserting within the loop, adjacent to the internal wall of the tube, an array of soft ferrite rods of low magnetic coercivity that can follow the frequency of the current circulating in the loop, and consequently multiply the radiation intensity many folds, and wherein, said arrays of ferrite rods may be one of lowered to the desired level inside a loop antenna by a winch controlled by the microcontroller and be affixed to the internal wall of the tube adjacent to the inscribed loop and wherein, the tubes include electrical conductors traversing its walls at consecutive levels along the loop antennas for the purpose of measuring the conductance ($\sigma$) of the soil between tubes.

16. The system for mapping the soil as in claim 1 wherein, the resonant frequency of the electromagnetic antennae that have to equal the resonant frequency of the soil layers that change from one layer to another and from one day to another depending on the climate, may be recalibrated in real-time, and wherein, said recalibration consists in changing the physical distance between the electrical ground and the back of the radiating surface of the antenna facing the electrical ground, wherein, the back of the radiating surface of the antenna is coated with a high dielectric constant material, and wherein said physical distance is changed by remotely controlled mechanical means placed between the electrical ground and a back plate, and wherein changing the average permittivity of the space between the radiating surface, and the electrical ground, changes the resonant frequency of the antennae and wherein, equating the resonant frequency of the antennae to that of the soil is achieved successively by measuring the straight line transmission of the radiation while changing the resonant frequency of the transmitter and receiver until maximal transmission distance is achieved.

* * * * *